United States Patent
Pao et al.

(10) Patent No.: US 11,523,434 B2
(45) Date of Patent: Dec. 6, 2022

(54) METHOD FOR RANDOM ACCESSING AND USER EQUIPMENT USING THE SAME

(71) Applicant: Acer Incorporated, New Taipei (TW)

(72) Inventors: Wei-Chen Pao, New Taipei (TW); Chien-Min Lee, New Taipei (TW)

(73) Assignee: Acer Incorporated, New Taipei (TW)

( * ) Notice: Subject to any disclaimer, the term of this patent is extended or adjusted under 35 U.S.C. 154(b) by 219 days.

(21) Appl. No.: 16/574,089

(22) Filed: Sep. 18, 2019

(65) Prior Publication Data

US 2020/0100295 A1 Mar. 26, 2020

Related U.S. Application Data

(60) Provisional application No. 62/734,259, filed on Sep. 21, 2018.

(51) Int. Cl.
*H04W 74/08* (2009.01)
*H04L 5/00* (2006.01)
*H04W 24/08* (2009.01)
*H04W 56/00* (2009.01)

(52) U.S. Cl.
CPC ....... *H04W 74/0833* (2013.01); *H04L 5/0082* (2013.01); *H04L 5/0092* (2013.01); *H04W 24/08* (2013.01); *H04W 56/001* (2013.01); *H04W 74/0808* (2013.01)

(58) Field of Classification Search
CPC ............. H04W 74/0833; H04W 24/08; H04W 56/001; H04W 74/0808; H04W 72/042; H04W 72/0446; H04W 72/0453; H04W 52/0209; H04L 5/0082; H04L 5/0092; H04L 5/0053

See application file for complete search history.

(56) References Cited

U.S. PATENT DOCUMENTS

| | | |
|---|---|---|
| 2013/0336266 A1 | 12/2013 | Fischer et al. |
| 2014/0016573 A1 | 1/2014 | Nuggehalli et al. |
| 2020/0052803 A1* | 2/2020 | Deenoo ............... H04B 17/318 |
| 2020/0084802 A1* | 3/2020 | Jung ..................... H04W 16/14 |
| 2020/0092916 A1* | 3/2020 | Lee ...................... H04W 74/006 |
| 2020/0107275 A1* | 4/2020 | Cho ....................... H04B 7/0695 |
| 2020/0229236 A1* | 7/2020 | Ohara ................... H04L 5/0053 |
| 2021/0051683 A1* | 2/2021 | Li ........................ H04L 41/0806 |
| 2021/0176670 A1* | 6/2021 | Keskitalo .............. H04W 24/08 |
| 2021/0274555 A1* | 9/2021 | Alfarhan ........... H04W 74/0808 |
| 2021/0274559 A1* | 9/2021 | Hwang ................. H04W 24/10 |
| 2021/0298086 A1* | 9/2021 | Jiang .................. H04W 74/0833 |

OTHER PUBLICATIONS

ZTE Corporation et al., "Random access preamble structure and signaling," 3GPP TSG RAN WG1 Meeting #87, Nov. 14-18, 2016, pp. 1-6.

(Continued)

*Primary Examiner* — Pao Sinkantarakorn
*Assistant Examiner* — Kabir U Jahangir
(74) *Attorney, Agent, or Firm* — JCIPRNET

(57) ABSTRACT

A method for determining at least one random access channel (RACH) burst used by a user equipment (UE) including: determining a reference resource location by receiving a data service; and determining the resource location of the at least one random access channel burst according to the reference resource location and an offset.

26 Claims, 21 Drawing Sheets

(56) References Cited

OTHER PUBLICATIONS

Potevio, "Discussion on SSB design for NR-U," 3GPP TSG RAN WG1 Meeting #93, May 21-25, 2018, pp. 1-3.
NTT Docomo, Inc., "Remaining issues on RACH procedure," 3GPP TSG RAN WG1 Meeting #93, May 21-25, 2018, pp. 1-9.
Ericsson., "On NR random-access response signal format." 3GPP TSG RAN WG1 Meeting #87, Nov. 14-18, 2016, pp. 1-3.
Rohde & Schwarz et al., "Editorial correction to TC 7.1.2.9 (alignment with PRD13)." 3GPP TSG RAN WG5 Meeting #79, May 21-25, 2018, pp. 1-7.
Nokia., "Radio Interface Enhancements for TA based multilateration (Update of RP-160034)." 3GPP TSG RAN WG6 #1, Aug. 22-26, 2016, pp. 1-10.
"Search Report of Europe Counterpart Application", dated Mar. 24, 2020, p. 1-p. 15.

* cited by examiner

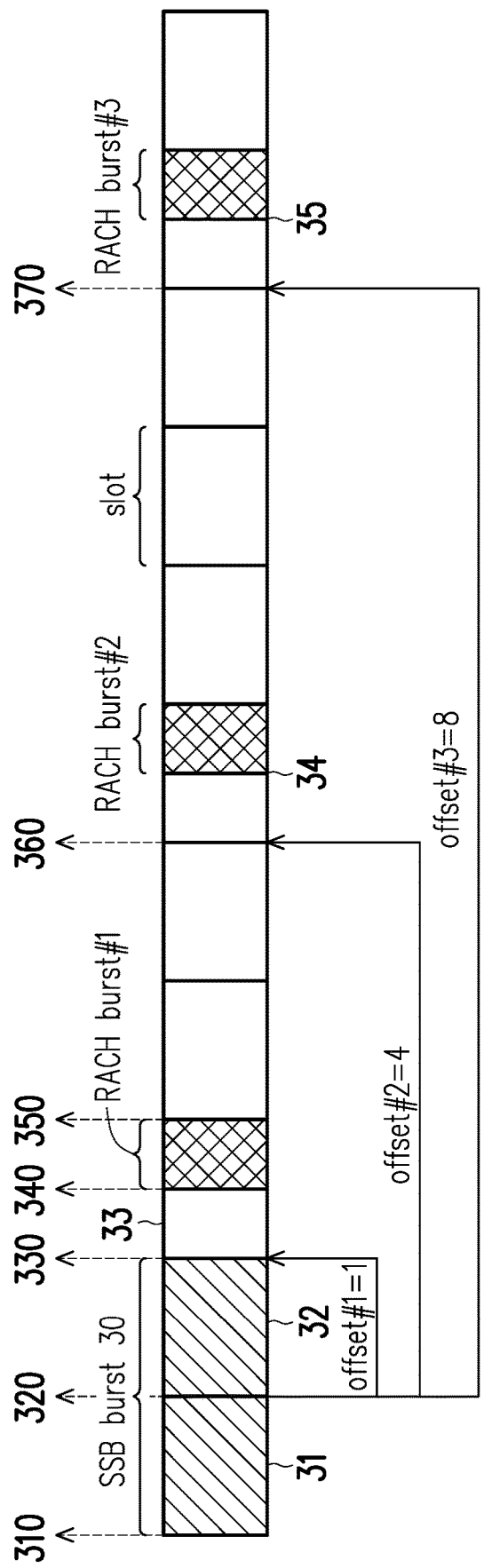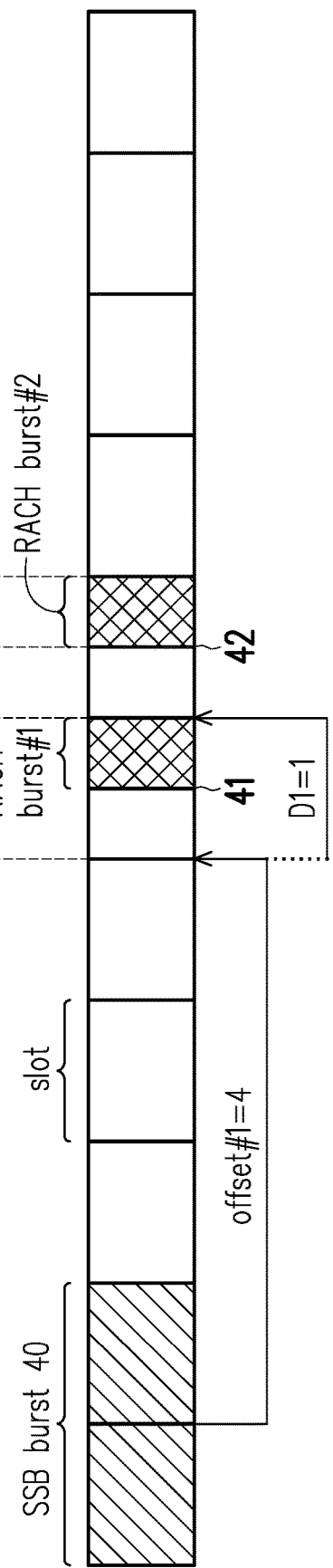
FIG. 3
FIG. 4

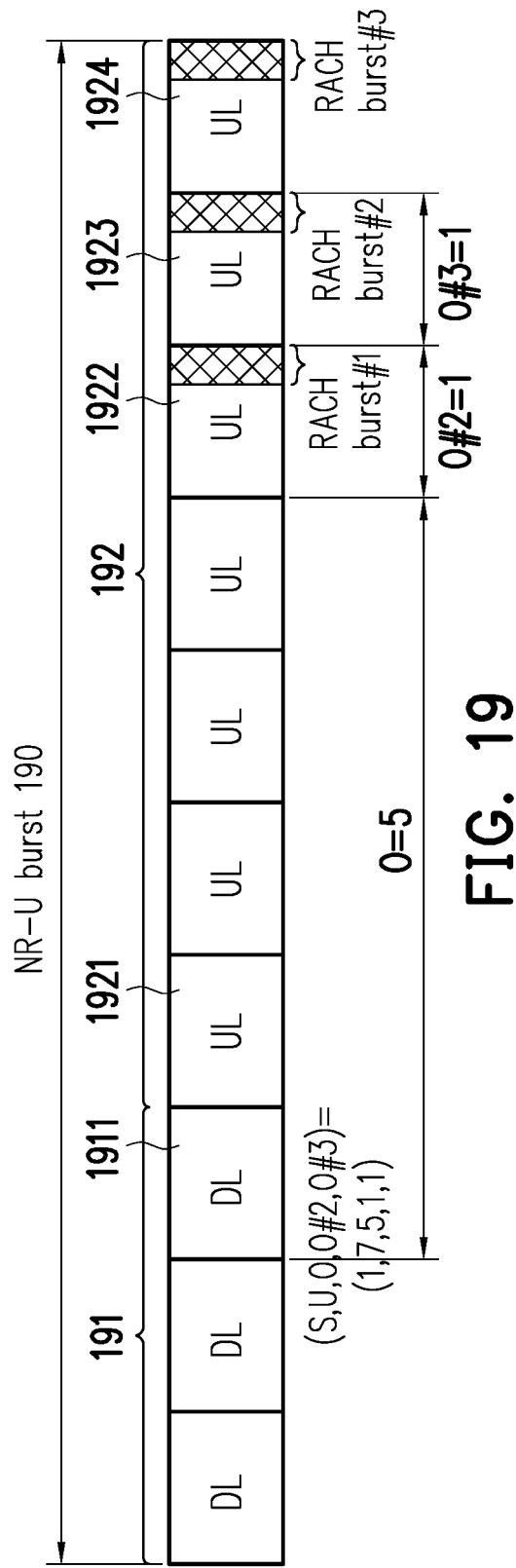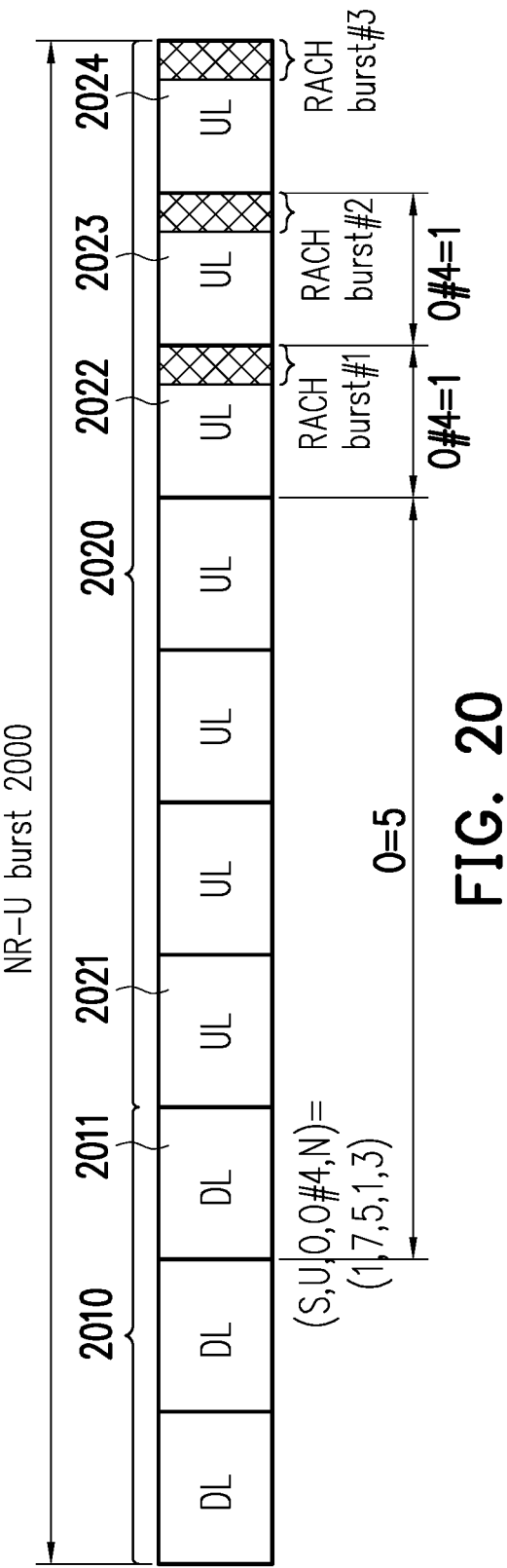

METHOD FOR RANDOM ACCESSING AND USER EQUIPMENT USING THE SAME

CROSS-REFERENCE TO RELATED APPLICATION

This application claims the priority benefit of U.S. provisional application Ser. No. 62/734,259, filed on Sep. 21, 2018. The entirety of the above-mentioned patent application is hereby incorporated by reference herein and made a part of this specification.

BACKGROUND

Technical Field

The disclosure is related to a method for determining at least one random access channel (RACH) burst, a method for performing a random access (RA) procedure, and user equipments (UE) using the same methods.

Description of Related Art

In a fifth generation (5G) network, a UE may communicate to other devices through unlicensed spectrum. On unlicensed spectrum, a listen before talk (LBT) procedure (or a clear channel assessment (CCA) check) for a RA procedure may be performed before the UE is enabled to transmit a signal (e.g., a random access preamble (RAP)) or before a new radio unlicensed (NR-U) next generation node b (gNB) is enabled to transmit a signal (e.g., a random access response (RAR)). The latency for performing the RA procedure may be increased due to an LBT procedure performed by the UE or the NR-U gNB has failed. The LBT failure may also cause other problems. For example, a UE may start to detect a RAR after transmitting a RAP. However, if an LBT failure occurred, the UE would spend a lot of time on monitoring the RAP, thus the power of the UE would be wasted. Accordingly, it is necessary to provide a method of random accessing for the UE.

SUMMARY

A method for determining at least one RACH burst, a method for performing a RA procedure, and UEs using the same methods are provided in the disclosure.

The disclosure provides a method for determining at least one random access channel burst used by a user equipment comprising: determining a reference resource location by receiving a data service; and determining the resource location of the at least one random access channel burst according to the reference resource location and an offset.

In an embodiment, the offset indicates a time interval between the reference resource location and the resource location.

In an embodiment, the at least one random access channel burst comprising a first random access channel burst corresponding to the resource location and a second random access channel burst corresponding to a second resource location, and the method further comprising: obtaining a second offset; and determining the second resource location according to the resource location and the second offset.

In an embodiment, the second offset indicates a second time interval between the resource location and the second resource location.

In an embodiment, the method further comprising: obtaining a number of the at least one random access channel burst, wherein the step of determining the second resource location according to the resource location and the second offset comprising: determining the second resource location according to the resource location, the second offset, and the number of the at least one random access channel burst.

In an embodiment, the second offset indicates a second time interval between two of adjacent random access channel bursts corresponding to the at least one random access channel burst.

In an embodiment, the at least one random access channel burst further comprising a third random access channel burst corresponding to a third resource location, and the method further comprising: obtaining a third offset; and determining the third resource location according to the second resource location and the third offset.

In an embodiment, the method further comprising: transmitting, via the at least one random access channel burst, one of a plurality of random access channel sequences.

In an embodiment, the step of transmitting, via the at least one random access channel burst, the one of the plurality of random access channel sequences comprising: performing a listen before talk procedure before transmitting the one of the plurality of random access channel sequences.

In an embodiment, the offset is a second offset after a first offset associated with a first resource location of at least one first random access channel burst.

In an embodiment, the method further comprising: in response to a listen before talk procedure corresponding to the at least one first random access channel burst has failed, transmitting, via the at least one random access channel burst, one of a plurality of random access channel sequences.

In an embodiment, the resource location and the second resource location are respectively corresponded to one of the following: a first time-frequency resource overlapped with a bandwidth part; a second time-frequency resource outside of the bandwidth part; a third time-frequency resource corresponding to a first sub-band of the bandwidth part; and a fourth time-frequency resource corresponding to a second sub-band of the bandwidth part.

In an embodiment, the offset is pre-configured to the user equipment.

In an embodiment, the offset is obtained from one of the following: a higher layer signal, wherein the higher layer signal corresponding to a communication layer higher than a physical layer; a physical layer signal, wherein the physical layer signal corresponding to downlink control information or a slot format indicator; and an offset table.

In an embodiment, the method further comprising: selecting one of the at least one random access channel burst for performing a communication according to one of the following: a random selection; a user equipment identifier; a listen before talk result for the at least one random access channel burst; a burst ordering; and an indication from a base station.

In an embodiment, the data service corresponds to a synchronization signal block burst.

In an embodiment, the step of determining the resource location of the at least one random access channel burst according to the reference resource location and the offset comprising: determining the resource location according to the reference resource location in response to a previous reference resource location is unavailable to the user equipment.

In an embodiment, the method further comprising: transmitting, via the at least one random access channel burst, one of a plurality of random access channel sequences according to an index of the synchronization signal block burst.

In an embodiment, the method further comprising: transmitting, via the at least one random access channel burst, one of a plurality of random access channel sequences according to a measurement result of the synchronization signal block burst.

In an embodiment, the method further comprising: determining the at least one random access channel burst corresponding to the synchronization signal block burst is enabled in response to receiving the synchronization signal block burst.

In an embodiment, the synchronization signal block burst comprises an indicator, and the indicator indicates whether the at least one random access channel burst is enabled or not.

In an embodiment, the method further comprising: performing a first type listen before talk procedure for the at least one random access channel burst in response to not receiving the synchronization signal block burst during an expected time interval.

In an embodiment, the method further comprising: performing a first type listen before talk procedure for the at least one random access channel burst in response to not receiving a downlink signal before accessing the at least one random access channel burst.

In an embodiment, the method further comprising: performing a first type listen before talk procedure for the at least one random access channel burst in response to receiving a downlink signal before accessing the at least one random access channel burst, wherein a time gap between the downlink signal and the at least one random access channel burst is greater than a first time interval.

In an embodiment, the method further comprising: performing a second type listen before talk procedure for the at least one random access channel burst in response to receiving a downlink signal before accessing the at least one random access channel burst, wherein a second time gap between the downlink signal and the at least one random access channel burst is greater than a second time interval but less than a first time interval.

In an embodiment, the method further comprising: obtaining a second offset associated with a second resource location of the at least one random access channel burst; and determining the second resource location according to a second reference resource location and the second offset, wherein the second reference resource location is indicated by a second synchronization signal block burst.

In an embodiment, the method further comprising: selecting a candidate synchronization signal block burst from a plurality of synchronization signal block bursts; and determining the reference resource location according to the candidate synchronization signal block burst.

In an embodiment, the data service corresponds to a new radio unlicensed burst.

In an embodiment, the reference resource location corresponding to one of the followings: a first slot of an uplink burst in the data service; a first slot of a downlink burst in the data service; a last slot of the downlink burst in the data service; and a first slot of the data service.

In an embodiment, a downlink signal indicates whether the at least one random access channel burst is enabled or not.

In an embodiment, the downlink signal comprises at least one of the following: a shift indicator, indicating a number of slots from a downlink slot carrying the downlink signal to a start of an uplink burst in the data service; an uplink burst duration, indicating a number of uplink slots in an uplink burst of the data service; and a downlink burst duration, indicating a number of downlink slots in a downlink burst of the data service.

In an embodiment, the method further comprising: determining the at least one random access channel burst corresponding to the downlink signal is enabled in response to receiving the downlink signal.

In an embodiment, the reference resource location is indicated by one of a synchronization signal block burst received by the user equipment and a new radio unlicensed burst received by the user equipment.

In an embodiment, the step of determining the resource location according to the reference resource location and the offset comprising: determining the resource location according to the new radio unlicensed burst in response to receiving the new radio unlicensed burst; and determining the resource location according to the synchronization signal block burst in response to not receiving the new radio unlicensed burst.

In an embodiment, the method further comprising: receiving a listen before talk type indicator; and performing a listen before talk procedure for the at least one random access channel burst according to the listen before talk type indicator.

The disclosure provides a method for performing a random access procedure used by a user equipment comprising: starting a timer in response to transmitting a random access preamble.

In an embodiment, the method further comprising: stopping or resetting the timer in response to receiving a random access response corresponding to the random access preamble before the timer expires.

In an embodiment, the method further comprising: determining a random access problem exists in response to the timer expiring.

In an embodiment, the method further comprising: stopping or resetting the timer in response to transmitting the random access preamble successfully.

In an embodiment, the method further comprising at least one of the following: increasing a counter value in response to one of transmitting the random access preamble successfully or transmitting the random access preamble unsuccessfully; increasing the counter value in response to intending to transmit the random access preamble; or increasing the counter value in response to the timer expiring.

In an embodiment, the method further comprising: resetting the counter value in response to transmitting a second random access preamble after failing to transmit the random access preamble.

In an embodiment, the method further comprising: determining a random access problem exists in response to the counter value exceeding a threshold.

In an embodiment, the method further comprising: selecting the random access preamble from a plurality of random access preambles according to an index of a synchronization signal block, wherein the synchronization signal block is spatial domain correlated with the random access preamble.

In an embodiment, the random access preamble is selected from a plurality of bandwidth parts configured to the user equipment.

In an embodiment, the random access preamble is selected from a plurality of sub-bands of a bandwidth part configured to the user equipment.

In an embodiment, the method further comprising: detecting a triggering signal; and monitoring a response message during a response window according to a detecting result of the triggering signal.

In an embodiment, the step of monitoring the response message during the response window according to the detecting result of the triggering signal comprising: starting the response window for monitoring the response message in response to the triggering signal is detected during a time window.

In an embodiment, the step of monitoring the response message during the response window according to the detecting result of the triggering signal comprising: extending the response window in response to the response message is not detected during the response window.

In an embodiment, the method further comprising: monitoring the response message in an additional response window in response to the response message is not detected during the response window.

In an embodiment, the method further comprising: selecting, from a plurality of response windows, the response window for monitoring the response message according to one of the following: a random selection; a user equipment identifier; a transmitted signal corresponded to the response message; a listen before talk result for each of the plurality of response windows; a response window ordering; and an indication from a base station.

In an embodiment, the response message is a hybrid automatic repeat request acknowledge corresponding to an uplink signal.

The disclosure provides a user equipment comprising: a transceiver and a processor. The processor connected to the transceiver and configured at least to: determine a reference resource location by receiving, via the transceiver, a data service; and determine the resource location of at least one random access channel burst according to the reference resource location and an offset.

The disclosure provides a user equipment comprising: a transceiver and a processor. The processor connected to the transceiver and configured at least to: start a timer in response to transmitting a random access preamble.

Based on the above, the disclosure provides a method for a UE to estimate a resource location of a RACH burst by using an offset received from a higher layer signal. Furthermore, a timer or a counter may be utilized to help the UE to determine if a RA problem exists or is the transmission power of the UE should be increased. The disclosure also provides a method for triggering a response window for the UE to monitor a RAR during the response window, so that the UE would not spend too much time on detecting the RAR and the power of the UE can thus be saved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 3 is a schematic diagram of determining a RACH burst based on a SSB burst according to an embodiment of the disclosure.

FIG. 4 is a schematic diagram of determining at least two RACH bursts based on the SSB burst according to an embodiment of the disclosure.

FIG. 19 is a schematic diagram of determining at least three RACH burst based on a NR-U burst according to an embodiment of the disclosure.

FIG. 20 is a schematic diagram of determining at least three RACH burst based on a NR-U burst according to another embodiment of the disclosure.

DESCRIPTION OF THE EMBODIMENTS

Figure 1:
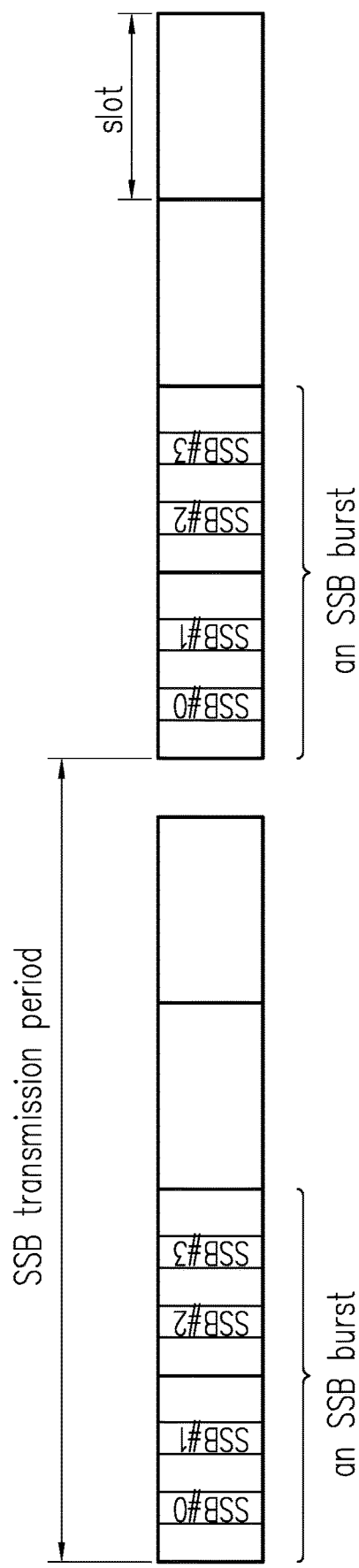
FIG. 1 is a schematic diagram of performing an LBT procedure by using a synchronization signal block (SSB) according to an embodiment of the disclosure.

Due to the characteristics of using unlicensed spectrum, an LBT procedure (or a CCA check) is required before occupying or using a channel, wherein the LBT procedure may be implemented by, for example, a transmission information broadcasting such as an SSB transmission or a synchronization signal and physical broadcast channel (SS/PBCH) block transmission. FIG. 1 is a schematic diagram of performing an LBT procedure by using an SSB according to an embodiment of the disclosure. One or more SSBs may be transmitted via an SSB burst during an SSB transmission period, wherein the SSB burst may not be transmitted due to, for example, an LBT failure. For example, referring to FIG. 1, four SSBs (i.e., SSB #0, SSB #1, SSB #2, and SSB #3) have been transmitted via an SSB burst during an SSB transmission period, wherein the subcarrier spacing (SCS) of the SSBs is, for example, 15 KHz. A UE may rely on an SSB to access a network. Specifically, a UE may acquire random access resource via an SSB, but the disclosure is not limited thereto. For example, a UE may also acquire random access resource via system information or a common search space. An SSB may include at least one of a primary synchronization signal (PSS), a secondary synchronization signal (SSS), a physical broadcast channel (PBCH), and system information.

Figure 2:
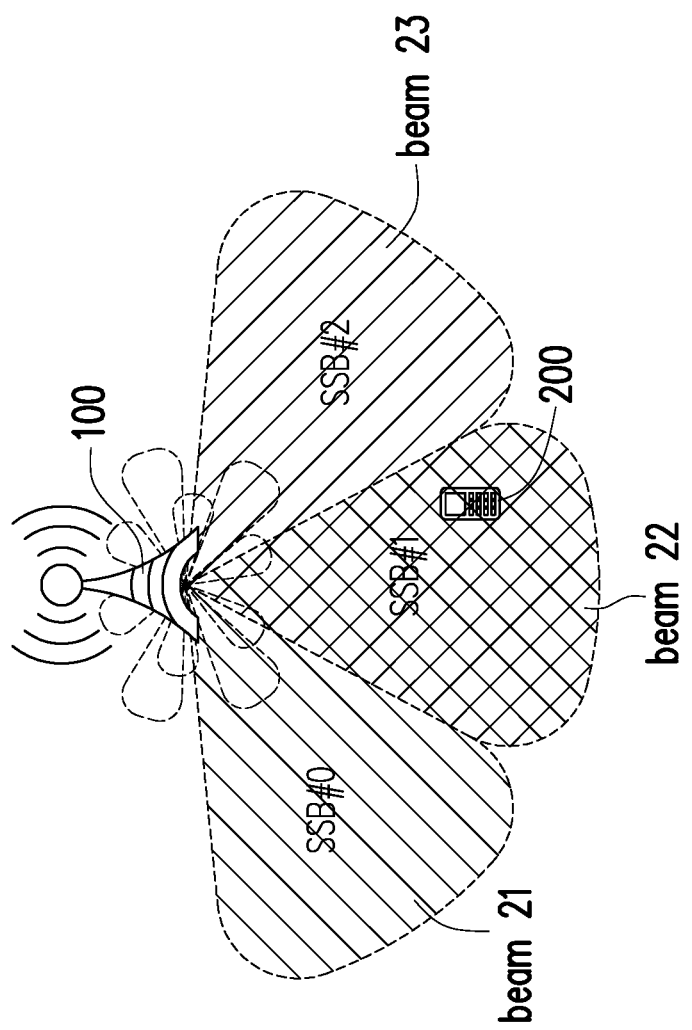
FIG. 2 is a schematic diagram of serving a UE via unlicensed spectrum according to an embodiment of the disclosure.

FIG. 2 is a schematic diagram of serving a UE 200 via unlicensed spectrum according to an embodiment of the disclosure. It is assumed that a base station (BS) 100 such as a gNB may serve the UE 200 via at least one beam (e.g., an unlicensed beam), such as beam 21, beam 22, and beam 23 which are respectively corresponding to SSB #0, SSB #1, and SSB #2. An independent directional LBT procedure may be performed on each of the beams. For example, the BS 100 may perform an LBT procedure on beam 21 so as to occupy a channel of the beam 21 for the UE 200. If the simultaneously transmission of multiple beams is supported by the BS 100, the BS 100 may occupy the channels respectively corresponding to the beams 21-23 in the same time according to a successful LBT result for each of the beams 21-23, wherein the LBT result is generated by an LBT procedure which should be performed before occupying a channel corresponding to the beams 21, 22, or 23. On the other hand, if the simultaneously transmission of multiple beams is not supported by the BS 100, the BS 100 may occupy the channels respectively corresponding to the beams 21-23 in different time slots. Specifically, the BS 100 may apply beam sweep to sequentially occupy the beams 21-23. Beam sweep technology may or may not be supported by the BS 100 or the UE 200, the disclosure is not limited thereto.

The UE 200 may access one beam at a time to perform an LBT procedure for initiating a RA procedure. When the UE 200 applies a RA procedure on unlicensed spectrum, the access delay of the RA procedure may be seriously deteriorated due to uncertain LBT results or limited transmission opportunities. For example, if the UE 200 intends to transmit a RAP (also known as physical random access channel (PRACH) or MSG 1) via the beam 22, the transmission opportunity of the RAP may be blocked due to an LBT procedure corresponding to the beam 22 has failed. Then, the UE 200 has to wait for the next transmission opportunity to try again. For another example, if the BS 100 intends to transmit a RAR (also known as MSG 2) via the beam 22 in response to receiving a RAP from the UE 200, the transmission opportunity of the RAR may be blocked due to an LBT procedure corresponding to the beam 22 has failed. Then, the transmission of the RAR may be delayed. Accordingly, the UE 200 may attempt to detect DCI with cyclic redundancy check (CRC) scrambled by random access radio network temporary identifier (RA-RNTI) during a RAR window. If the UE 200 does not detect the DCI scrambled with RA-RNTI or does not correctly decode the corresponding downlink shared channel (DL-SCH) within the RAR window, a RACH retransmission will be followed by.

Therefore, large delay may be foreseen due to the LBT failure in the UE 200 side (e.g., for transmitting a RAP) or due to the LBT failure in the BS 100 side (e.g., for transmitting a RAR). To avoid unacceptable latency for the RA procedure, transmission opportunities for the RA procedure may need to be increased. However, a RA resource may not be periodically scheduled due to the reasons such as: the SSB has not been transmitted due to the LBT failure; or flexible scheduling is applied for utilizing the occupied radio resource. Therefore, a method for indicating the resource location of one or more RACH bursts must be provided, wherein the RACH bursts may be utilized to transmit a signal (e.g., RAP) related to RA procedure.

The disclosure provides a method for determining the resource location of a RACH burst according to a reference resource location and an offset, wherein the offset may be a fixed value pre-configured to the UE 200 by a higher layer signal, the reference resource location may be a resource location of a data service such as an SSB burst received by the UE 200 or a NR-U burst received by the UE 200. The higher layer signal may correspond to a communication layer higher than the physical (PHY) layer such as a medium access control (MAC) layer or a radio resource control (RRC) layer. For example, the higher layer signal may comprise a MAC control element (MAC CE) or an RRC message.

FIG. 3 is a schematic diagram of determining a RACH burst #1 (or RACH burst #2, RACH burst #3) based on an SSB burst 30 according to an embodiment of the disclosure. The UE 200 may obtain an offset #1 (e.g., pre-determined or obtained from a higher layer signal transmitted by the BS 100) associated with the resource location of the RACH burst #1, and may determine the resource location of the RACH burst #1 according to the offset #1. Specifically, the UE 200 may receive an SSB burst 30, wherein the resource location of the SSB burst 30 may be defined as a reference resource location. Then the UE 200 may determine the resource location of the RACH burst #1 according to the reference resource location and the offset #1.

The UE 200 may determine an available (or valid) burst (e.g., RACH burst #1) corresponding to the SSB burst 30 exists in response to receiving (or detecting) the SSB burst 30 associated with the RACH burst. By contrast, The UE 200 may determine an available RACH burst not exists in response to not receiving (or detecting) the SSB burst 30 associated with the RACH burst. The BS 100 may perform an LBT procedure before transmitting the SSB burst 30, and may transmit the SSB burst 30 to the UE 200 in response to the LBT procedure is successful.

In this embodiment, the reference resource location corresponding to SSB burst 30 is defined to be associated with time slot 32 which is the last time slot among multiple time slots (e.g., time slots 31 and 32) corresponding to the SSB burst 30, but the disclosure is not limited thereto. For example, the reference resource location corresponding to the SSB burst 30 may be defined to be associated with any of the multiple time slots corresponding to the SSB burst 30 (e.g., time slot 31 which is the first time slot corresponding to the SSB burst 30). More specifically, the reference resource location corresponding to the SSB burst 30 may be defined as one of the followings: the start of the SSB burst 30 (i.e., location 310), the end of the SSB burst 30 (i.e., location 330), the start of the last time slot 32 corresponding to the SSB burst 30 (i.e., location 320), or the end of the last time slot 32 corresponding to the SSB burst 30 (i.e., location 330).

The offset #1 indicates a time interval between the reference resource location corresponding to the SSB burst 30 and the resource location corresponding to the RACH burst #1, wherein the resource location corresponding to the RACH burst #1 may be defined (but not limited) as the start of the time slot 33 carrying the RACH burst #1 (i.e., location 330), the start of the RACH burst #1 (i.e., location 340), the end of the time slot 33 carrying the RACH burst #1 (i.e., location 350), or the end of the RACH burst #1 (i.e., location 350). For example, "offset #1=1" may indicate that the time interval between the location 320 (i.e., reference resource location) and the location 330 (i.e., resource location of the RACH burst #1) is equal to one time slot. It should be noted that the end of the time slot 33 carrying the RACH burst #1 and the end of the RACH burst #1 may be different in some embodiments.

In a similar manner, the UE 200 may obtain an offset #2 (e.g., from a higher layer signal transmitted by the BS 100) associated with the resource location of the RACH burst #2, and may determine the resource location of the RACH burst #2 according to the offset #2. For example, "offset #2=4" may indicate that the time interval between the location 320 (i.e., reference resource location) and the location 360 (i.e., resource location of the RACH burst #2 which is associated with time slot 34) is four time slots. The offset #1 and the offset #2 may be configured to the UE 200 via the same or different higher layer signals.

In a similar manner, the UE may obtain an offset #3 from a higher layer signal transmitted by the BS 100 associated with the resource location of the RACH burst #3, and may determine the resource location of the RACH burst #3 according to the offset #3. For example, "offset #3=8" may indicate that the time interval between the location 320 (i.e., reference resource location) and the location 370 (i.e., resource location of the RACH burst #3 which is associated with time slot 35) is eight time slots. The offset #3 and the offset #1 (or offset #2) may be configured to the UE 200 via the same or different higher layer signals.

In an embodiment, the UE 200 may select a RACH burst from multiple RACH bursts (e.g., RACH burst #1 and #2) for performing a communication (e.g., transmitting or receiving a RACH sequence) according to one of the followings: a random selection; a UE identifier (ID); an LBT result for the RACH burst; a LBT result for the SSB burst associated with the RACH burst; a burst ordering; and an indication from a BS. For example, if the UE 200 does not detect the SSB burst 30, the UE 200 may not perform an LBT procedure for the RACH burst #1 (or RACH burst #2) associated with the SSB burst 30. Therefore, the UE 200 cannot select the RACH burst #1 (or RACH burst #2) to transmit a RACH sequence. For another example, The UE 200 may select a RACH burst from multiple RACH bursts (e.g., RACH burst #1 and RACH burst #2) sequentially and determine whether a RACH sequence could be transmitted within the selected RACH burst according to a corresponding LBT result. If an LBT procedure for the RACH burst #1 is successful, the UE 200 may select the RACH burst #1 for transmitting the RACH sequence, and the UE 200 may no need to perform an LBT procedure for the RACH burst #2. If an LBT procedure for the RACH burst #1 is failed but an LBT procedure for the RACH burst #2 is successful, the UE 200 may select the RACH burst #2 instead of the RACH burst #1 for transmitting a RACH sequence. The RACH sequence transmitted via the RACH burst #2 may be the same as or different from the RACH sequence to be transmitted via the RACH burst #1.

In an embodiment, the UE 200 may perform an LBT procedure for a RACH burst (i.e., RACH burst #2) in response to a previous RACH burst (i.e., RACH burst #1) is unavailable (or invalid) to the UE 200. For example, if the LBT procedure for the RACH burst #1 is failed and the RACH burst #1 cannot be obtained by the UE 200, The UE 200 may further perform an LBT procedure for the RACH burst #2 associated with the SSB burst 30. In an embodiment, if the SSB burst 30 has been pre-configured (e.g., fixed location) to the UE 200, the UE 200 may perform an LBT procedure for the RACH burst #1 associated with the SSB burst 30 even if the SSB burst 30 is not received by the UE 200 (e.g., due to an LBT failure).

In an embodiment, the offset #1 and/or offset #2 may be pre-configured to the UE 200 via DCI or an offset table. The offset table may include a set of offsets, wherein each offset in the set indicates a time/frequency distance or location associated with at least one RACH burst. A higher layer signal from the BS 100 may be used for indicating an offset from the offset table, and the UE 200 may determine to access a corresponding RACH burst accordingly. The offset table may be, for example, Table 1 as shown below.

TABLE 1

| {offset}<br>(offset#1 and/or #2) | Description |
| --- | --- |
| {0} | No available RACH burst |
| {4, 8} | 2 RACH bursts are available, wherein offset#1 = 4 and offset#2 = 8 |
| {2} | 1 RACH burst is available, wherein offset#1 = 2 |
| {1, 3, 5, 7} | 4 RACH bursts are available, wherein offset#1 = 1, offset#2 = 3, offset#3 = 5, and offset#4 = 7 |

In an embodiment, the higher layer signal may be a N-bit message, wherein "N" is 2 in this embodiment, but the disclosure is not limited thereto. Accordingly, the offset table may be, for example, expressed as Table 2 shown below.

TABLE 2

| bit value | {offset}<br>(offset#1 and/or #2) | Description |
| --- | --- | --- |
| 00 | {0} | No available RACH burst |
| 01 | {4, 8} | 2 RACH bursts are available, wherein offset#1 = 4 and offset#2 = 8 |
| 10 | {2} | 1 RACH burst is available, wherein offset#1 = 2 |
| 11 | {1, 3, 5, 7} | 4 RACH bursts are available, wherein offset#1 = 1, offset#2 = 3, offset#3 = 5, and offset#4 = 7 |

A RACH burst may be defined as a set of time-frequency resources on which at least one RACH sequence (e.g., PRACH, MSG 1 (RAP) for 4-steps RA procedure, MSG 2 (RAR) for 4-steps RA procedure, or MSG A for 2-steps RA procedure) could be transmitted. The at least one RACH sequence may respectively correspond to at least one SSB within one SSB burst, each of the at least one SSB may correspond to one SSB index. One SSB may corresponding to at least one RACH sequence. Specifically, X SSBs (e.g., X=4, 8, or 64) may correspond one RACH burst, and Y RACH sequences (e.g., Y=64) may correspond to one SSB. For example, 2 SSBs (i.e., SSB #0 and SSB #1) may correspond to one SSB burst, and each of the 2 SSBs may be associated with 64 RACH sequences, as shown on Table 3.

TABLE 3

| RACH burst | |
| --- | --- |
| SSB#0 | SSB#1 |
| RACH sequence#0 | RACH sequence#64 |
| RACH sequence#1 | RACH sequence#65 |
| RACH sequence#2 | RACH sequence#66 |
| ... | ... |
| RACH sequence#63 | RACH sequence#127 |

Referring to Table 3, the UE 200 may transmit, via a RACH burst, at least one RACH sequence corresponding to the reference resource location of an SSB (e.g., SSB #0 or #1). For example, in response to the RACH burst is associated with the SSB #0 (e.g., the RACH burst and the SSB #0 are transmitted by the same beam), the UE 200 may transmit, via the RACH burst, one of RACH sequences #0-#63 to initiate a RA procedure with the BS 100 according to the SSB #0. On the other hand, in response to the RACH burst is associated with the SSB #1, the UE 200 may transmit, via the RACH burst, one of RACH sequences #64-#127 to initiate a RA procedure with the BS 100. In an embodiment, the UE 200 may transmit a RACH sequence according to an index of SSB burst and a measurement result of the SSB burst. For example, if the measurement result of the SSB #0 is better than the measurement result of the SSB #1, the UE 200 may initiate a RA procedure by transmitting a RACH sequence corresponding to the SSB #0. Specifically, the UE 200 may transmit a RACH sequence according to an index of the SSB #0. The measurement result may be, for example, reference signal received power (RSRP) or reference signal received quality (RSRQ) of the SSB.

FIG. 4 is a schematic diagram of determining at least two RACH bursts (i.e., RACH bursts #1-#2) based on the SSB burst 40 according to an embodiment of the disclosure. The UE 200 may obtain an offset #1 associated with the resource location of the RACH burst #1 and an offset D1 (e.g., pre-determined or obtained from a higher layer signal transmitted by the BS 100) associated with the resource location of the RACH burst #2. After determining the resource location of RACH burst #1 (which is associated with time slot 41) according to the reference resource location (i.e., resource location of SSB burst 40) and the offset #1, the UE 200 may determine the resource location of the RACH burst #2 (which is associated with time slot 42) according to the offset D1 and the resource location of the RACH burst #1 The offset D1 is an offset indicating a time interval between the resource location of the RACH burst #1 and the resource location of the RACH burst #2, wherein the resource location of the RACH burst #2 may be defined (but not limited to) as the start of the time slot 42 carrying the RACH burst #2 (i.e., location 420), the start of the RACH burst #2 (i.e., location 430), the end of the time slot 42 carrying the RACH burst #2 (i.e., location 440), or the end of the RACH burst #2 (i.e., location 440). For example, "D1=1" may indicate that the time interval between the location 410 (i.e., resource location of the RACH burst #1) and the location 420 (i.e., resource location of the RACH burst #2) is equal to one time slot. It should be noted that the end of the time slot 42 carrying the RACH burst #2 and the end of the RACH burst #2 may be different in some embodiments.

Figure 5:
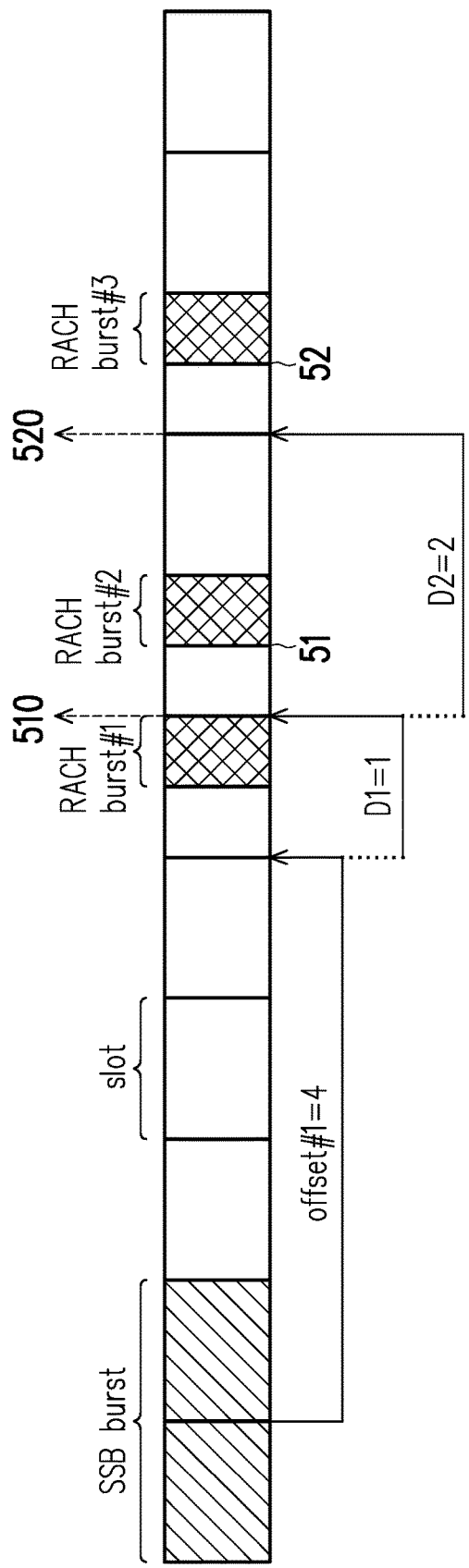
FIG. 5 is a schematic diagram of determining at least three RACH bursts based on the SSB burst according to an embodiment of the disclosure.

FIG. 5 is a schematic diagram of determining at least three RACH bursts (i.e., RACH bursts #1-#3) based on the SSB burst according to an embodiment of the disclosure. The UE 200 may obtain an offset #1 associated with the resource location of the RACH burst #1, an offset D1 associated with the resource location of the RACH burst #2, and an offset D2 (e.g., pre-determined or obtained from a higher layer signal transmitted by the BS 100) associated with the resource location of the RACH burst #3. After determining the resource locations of RACH burst #1 and RACH burst #2 according to the offset #1 and the offset D1, The UE 200 may determine the resource location of RACH burst #3 (which is associated with time slot 52) according to the offset D2 and the resource location of the RACH burst #2 (which is associated with time slot 51), wherein the offset D2 may or may not be the same as the offset D1. For example, "D2=2" may indicate that the time interval between the location 510 (i.e., resource location of the RACH burst #2) and the location 520 (i.e., resource location of the RACH burst #3) is equal to two time slots.

In an embodiment, the offset D1 and/or the offset D2 may be pre-configured to the UE 200 via DCI or an offset table. The offset table may include a set of offsets, wherein each offset in the set indicates a time/frequency distance or location associated with at least one RACH burst (excluding the first RACH burst among the multiple RACH bursts received by the UE 200). A higher layer signal (or DCI) from the BS 100 may be used for indicating an offset from the offset table, and the UE 200 may determine to access the corresponding RACH burst accordingly. The offset table may be, for example, Table 4 as shown below, wherein "T" represents an indication for indicating a set of offsets corresponding to available RACH bursts, and the UE 200 may obtain the indication "T" from a higher layer signal transmitted by the BS 100. It should be noted that the indication "T" may be carried by an N-bit message, but the disclosure is not limited thereto.

TABLE 4

| T | {offset}<br>(D1 and/or D2) | Description |
| --- | --- | --- |
| 0 | {0} | No available RACH burst |
| 1 | {1} | 1 RACH bursts are available, wherein D1 = 1 |
| 2 | {1, 4} | 2 RACH bursts are available, wherein D1 = 1 and D2 = 4 |
| 3 | {2} | 1 RACH bursts are available, wherein D1 = 2 |

Figure 6:
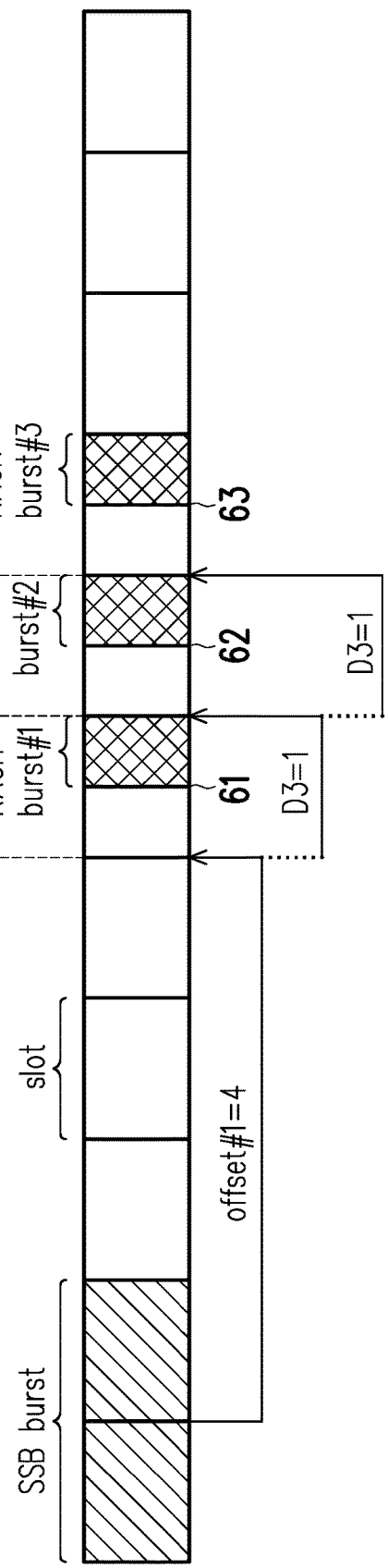
FIG. 6 is a schematic diagram of determining at least three RACH bursts based on the SSB burst according to another embodiment of the disclosure.

FIG. 6 is a schematic diagram of determining at least three RACH bursts (i.e., RACH bursts #1-#3) based on the SSB burst according to another embodiment of the disclosure. The UE 200 may obtain an offset #1 associated with the resource location of the RACH burst #1, an offset D3, and the number of RACH bursts which are available to (or valid to) the UE 200, wherein the number of RACH bursts is equal to three in this embodiment, but the disclosure is not limited thereto. The offset D3 indicates a time interval between two of adjacent RACH bursts, wherein the adjacent RACH bursts may refer to two RACH bursts which have no other RACH burst in between. After determining the resource location of RACH burst #1, the UE 200 may determine the resource locations of RACH bursts #2 and RACH bursts #3 according to the offset D3 and the number of RACH bursts. For example, "D3=1" may indicate the time interval between the location 610 (i.e., resource location of RACH burst #1 which is associated with time slot 61) and 620 (i.e., resource location of RACH burst #2 which is associated with time slot 62), or may indicate the time interval between the location 620 (i.e., resource location of RACH burst #2) and the location 630 (i.e., resource location of RACH burst #3 which is associated with time slot 63).

Figure 7:
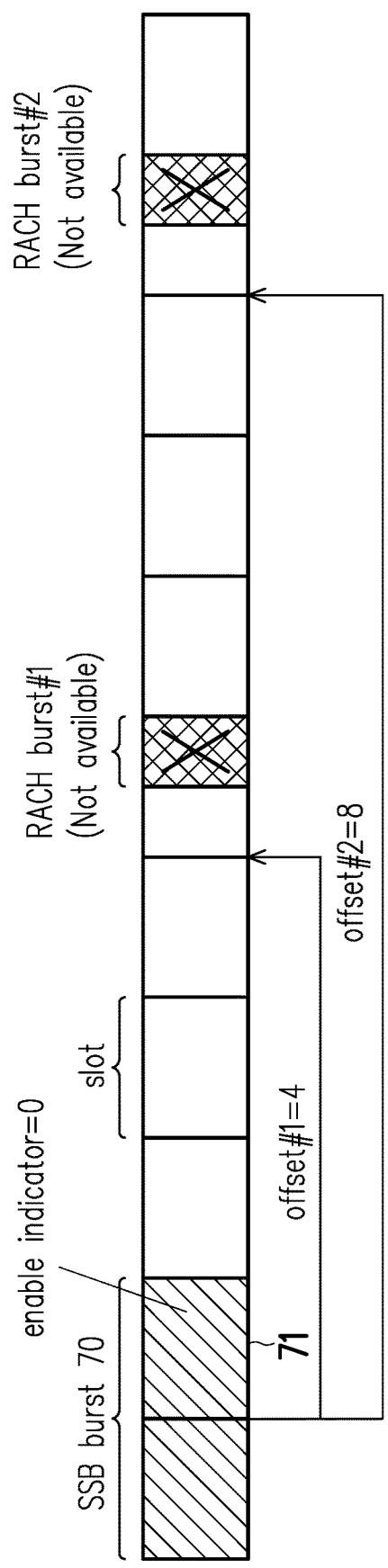
FIG. 7 is a schematic diagram of enabling at least one RACH burst by an enable indicator according to an embodiment of the disclosure.

FIG. 7 is a schematic diagram of enabling at least one RACH burst (e.g., RACH burst #1 and/or RACH burst #2) by an enable indicator according to an embodiment of the disclosure. For a RACH burst which is associated with an SSB burst 70, an enable indicator could be utilized to indicate whether the RACH burst is enabled (or available to the UE 200). The enable indicator could be transmitted via, for example, at least one SSB associated with the SSB burst 70. For example, referring to FIG. 7, an enable indicator may be carried by SSB 71 associated with the SSB burst 70. The UE 200 may determine whether a RACH burst associated with the SSB burst 70 is enabled according to the enable indicator, wherein the UE 200 may obtain the enable indicator from the received SSB 71. If the enable indicator is equal to zero, the UE 200 may determine that the RACH burst (e.g., RACH burst #1 and/or RACH burst #2) associated with the SSB burst 70 is unavailable. On the other hand, if the enable indicator is equal to one, the UE 200 may determine that the RACH burst associated with the SSB burst 70 is available.

Figure 8:
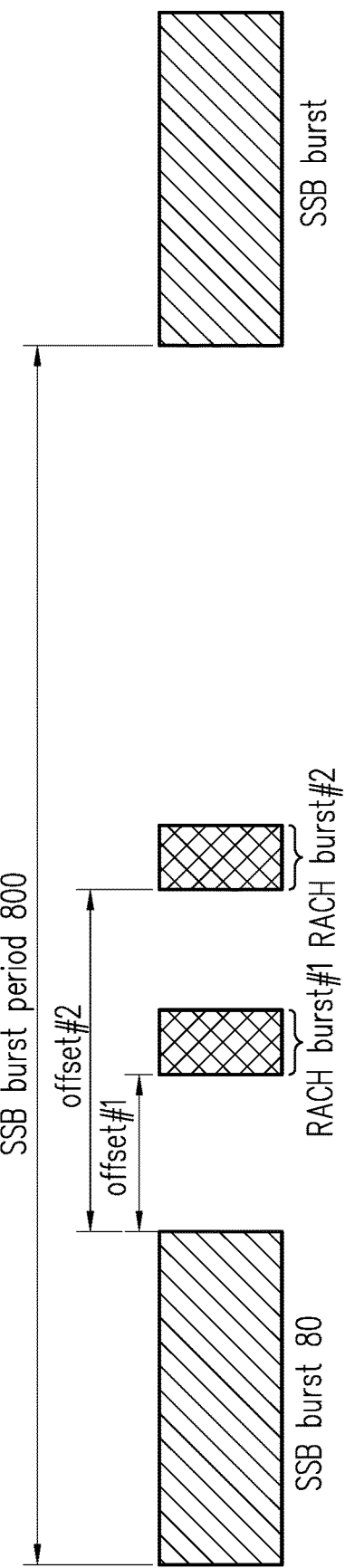
FIG. 8 is a schematic diagram of one SSB burst is configured in an SSB burst period according to an embodiment of the disclosure.

FIG. 8 is a schematic diagram of one SSB burst 80 is configured in an SSB burst period 800 according to an embodiment of the disclosure, wherein the SSB burst period 800 may equal to 20 ms, 40 ms, 80 ms, or 160 ms, the disclosure is not limited thereto. For the case when merely one SSB burst 80 is configured in the SSB burst period 800, the value of the offset may indicate the time/frequency distance between the reference resource location (i.e., resource location of the SSB burst 80) and the resource location of a RACH burst. For example, when merely one SSB burst 80 is configured in the SSB burst period 800, the offset #1 may indicate the time interval between the resource location of SSB burst 80 and the resource location of the RACH burst #1, and the offset #2 may indicate the time interval between the resource location of the SSB burst 80 and the resource location of the RACH burst #2.

Figure 9A:
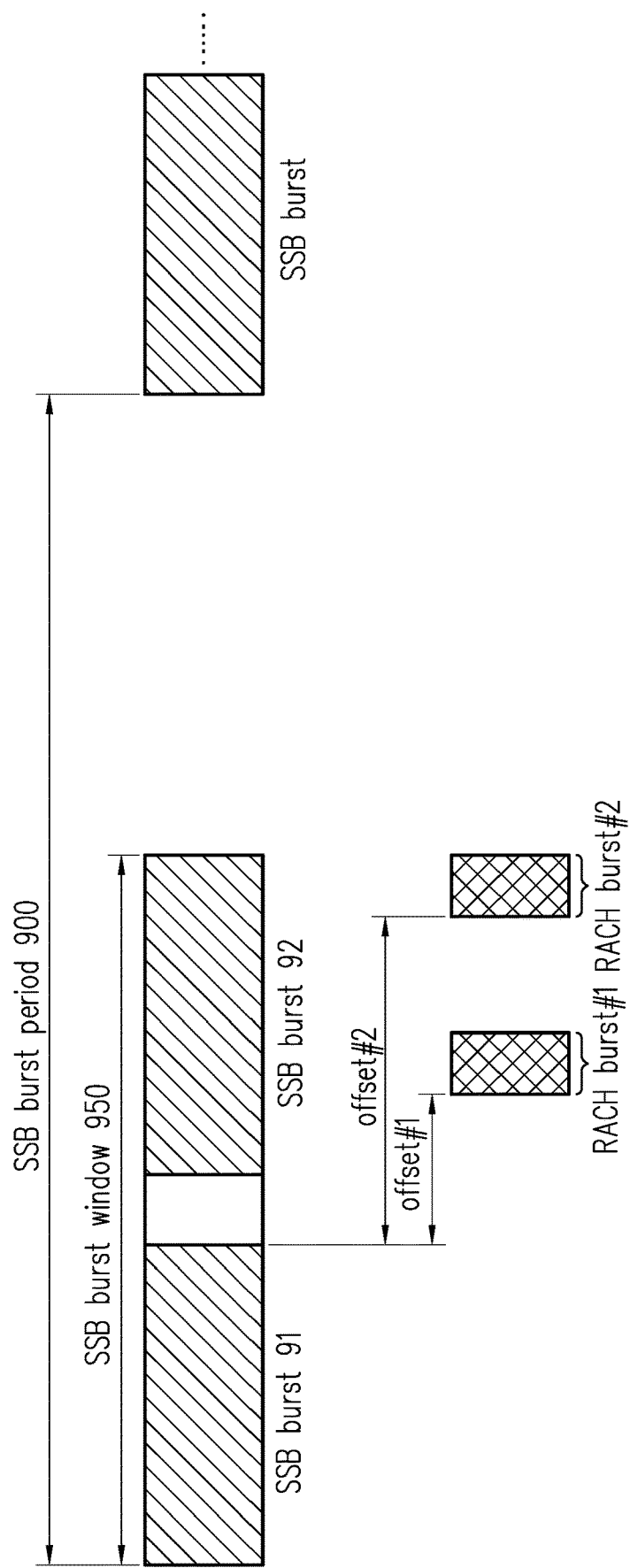
FIG. 9A and FIG. 9B are schematic diagrams of at least two SSB bursts are configured in an SSB burst period according to an embodiment of the disclosure.
Figure 9B:
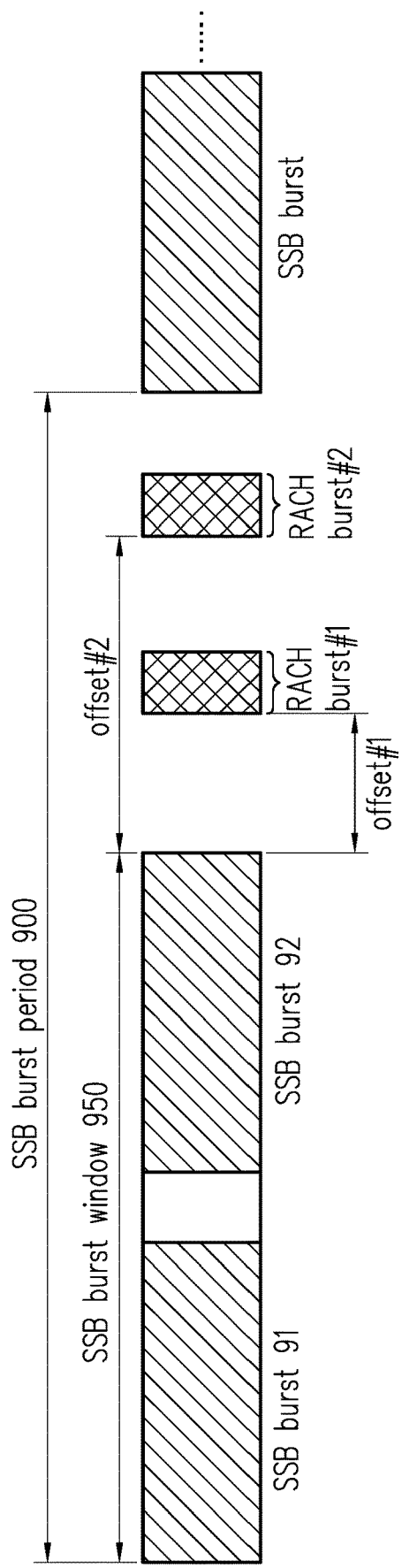

FIG. 9A and FIG. 9B are schematic diagrams of at least two SSB bursts (i.e., SSB bursts 91 and 92) are configured in an SSB burst period 900 according to an embodiment of the disclosure. Referring to FIG. 9A, for the case when at least two SSB bursts are configured in the SSB burst period 900, the value of the offset may indicate the time/frequency distance between the reference resource location and the resource location of the RACH burst, wherein the reference resource location may be a resource location of the SSB burst candidate, and the SSB burst candidate may refer to the SSB burst actually detected by the UE 200. For example, it is assumed that the SSB bursts (i.e., SSB bursts 91 and 92) within the SSB burst window 950 are detected by the UE 200. Both of the SSB burst 91 or the SSB burst 92 may be an SSB burst candidate utilized for indicating a resource location of a RACH burst. If the SSB burst 91 previous to the SSB burst 92 is available to the UE 200 due to, for example, an successful LBT procedure, the UE 200 may determine the resource location of the RACH burst #1 according to the reference resource location and the offset #1, wherein the reference resource location is the resource location of the SSB burst 91.

However, if the SSB burst 91 is unavailable to the UE 200 due to, for example, an failed LBT procedure, the UE 200 may determine the resource location of the RACH burst #1 according to the reference resource location and the offset #1 in response to a previous reference resource location is unavailable to the UE 200, as illustrated in FIG. 9B, wherein the reference resource location is the resource location of the SSB burst 92 and the previous reference resource location is the resource location of the SSB burst 91. That is, the determination of whether to utilize, by the UE 200, the resource location of the SSB burst 92 for obtaining the resource locations of RACH burst #1 and RACH burst #2 may be affected by an LBT result of the SSB burst 91. The UE 200 may select a candidate SSB burst from multiple SSB bursts, wherein the resource location of the candidate SSB burst may be the reference resource location for determining a resource location of a RACH burst. It should be noted that the value of the offset (e.g., offset #1 and/or offset #2) may be determined by the BS 100 to avoid RACH burst colliding with downlink (DL) transmission.

Figure 10:
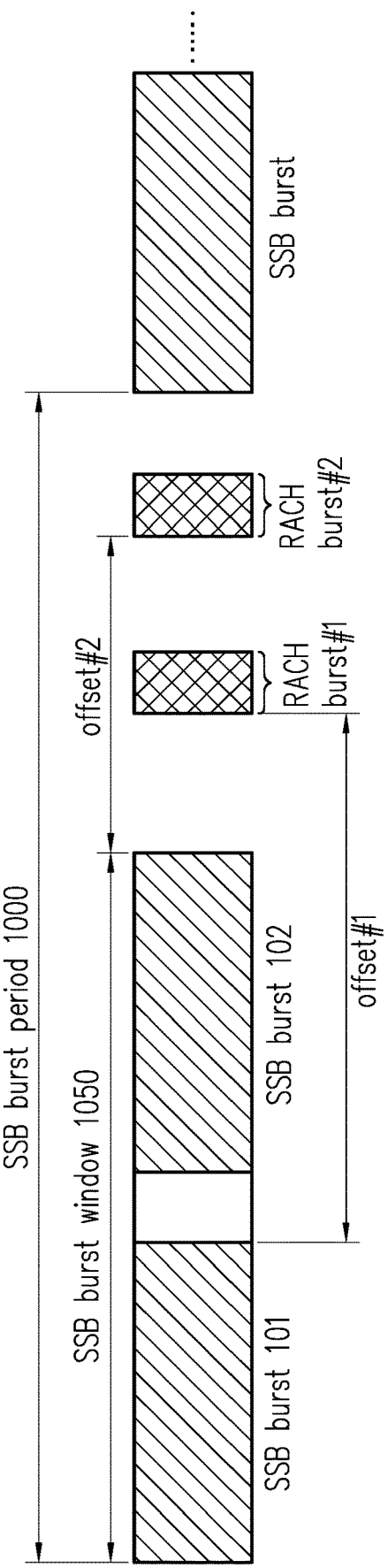
FIG. 10 is a schematic diagram of at least two SSB bursts are configured in an SSB burst period according to another embodiment of the disclosure.

FIG. 10 is a schematic diagram of at least two SSB bursts (i.e., SSB bursts 101 and 102) are configured in an SSB burst period 1000 according to another embodiment of the disclosure. For the case when at least two SSB burst are configured in the SSB burst period 1000, the UE 200 may determine the resource locations of different RACH burst according to different SSB bursts respectively. For example, it is assumed that the SSB bursts (i.e., SSB bursts 101 and 102) within the SSB burst window 1050 are detected by the UE 200. Accordingly, The UE 200 may determine the resource location of the RACH burst #1 according to a first reference resource location and the offset #1, wherein the first reference resource location is the resource location of the SSB burst 101. On the other hand, the UE 200 may determine the resource location of the RACH burst #2 according to a second reference resource location and the offset #2, wherein the second reference resource location is the resource location of the SSB burst 102.

Figure 11:
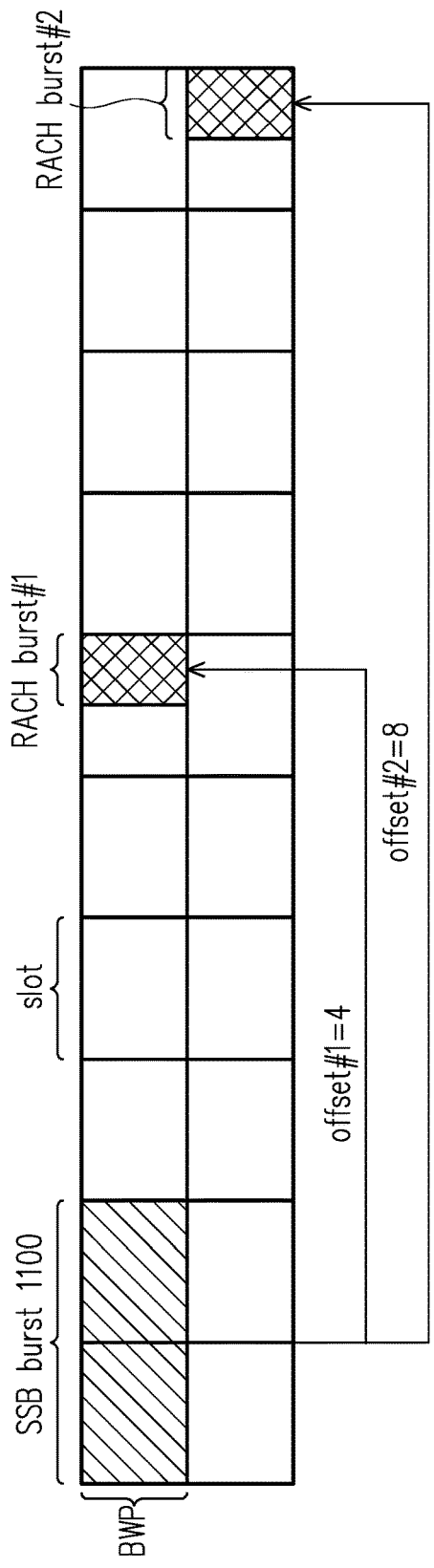
FIG. 11 is a schematic diagram of resource locations of different RACH bursts according to an embodiment of the disclosure.

A frequency bandwidth of a RACH burst and a frequency bandwidth of an SSB associated with the RACH burst may be fully overlapped, partly overlapped, or not overlapped. Frequency bandwidths respectively corresponding to different RACH bursts may be fully overlapped, partly overlapped, or not overlapped, where the different RACH bursts may be associated with the same SSB. FIG. 11 is a schematic diagram of resource locations of different RACH bursts (i.e., RACH burst #1 and RACH burst #2) according to an embodiment of the disclosure. The RACH burst #1 may be configured to a time-frequency resource fully overlapped with a bandwidth part (BWP) of the associated SSB burst 1100, wherein the BWP may be known to the UE 200 since the BWP may be pre-configured to the UE 200. On the other hand, the RACH burst #2 may be configured to a time-frequency resource outside of the BWP of the associated SSB burst 110. The frequency bandwidth of the RACH burst #1 or #2 may be configured to the UE 200 by the BS 100 via, for example, a higher layer signal.

Figure 12:
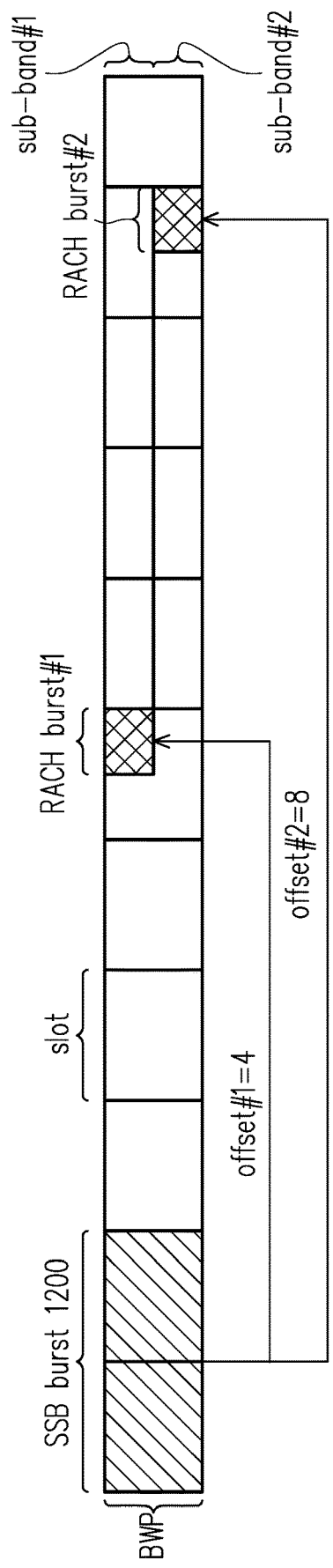
FIG. 12 is a schematic diagram of resource locations of different RACH bursts according to another embodiment of the disclosure.

Frequency bandwidths respectively corresponding to different RACH bursts may be mapped to the same or different sub-bands corresponding to one BWP, one BS, or one frequency range. FIG. 12 is a schematic diagram of resource locations of different RACH bursts (i.e., RACH burst #1 and RACH burst #2) according to another embodiment of the disclosure. The RACH burst #1 may be configured to a time-frequency resource corresponding to the sub-band #1 of a BWP of the associated SSB burst 1200. On the other hand, the RACH burst #2 may be configured to a time-frequency resource corresponding to the sub-band #2 of the BWP of the associated SSB burst 1200.

Figure 13:
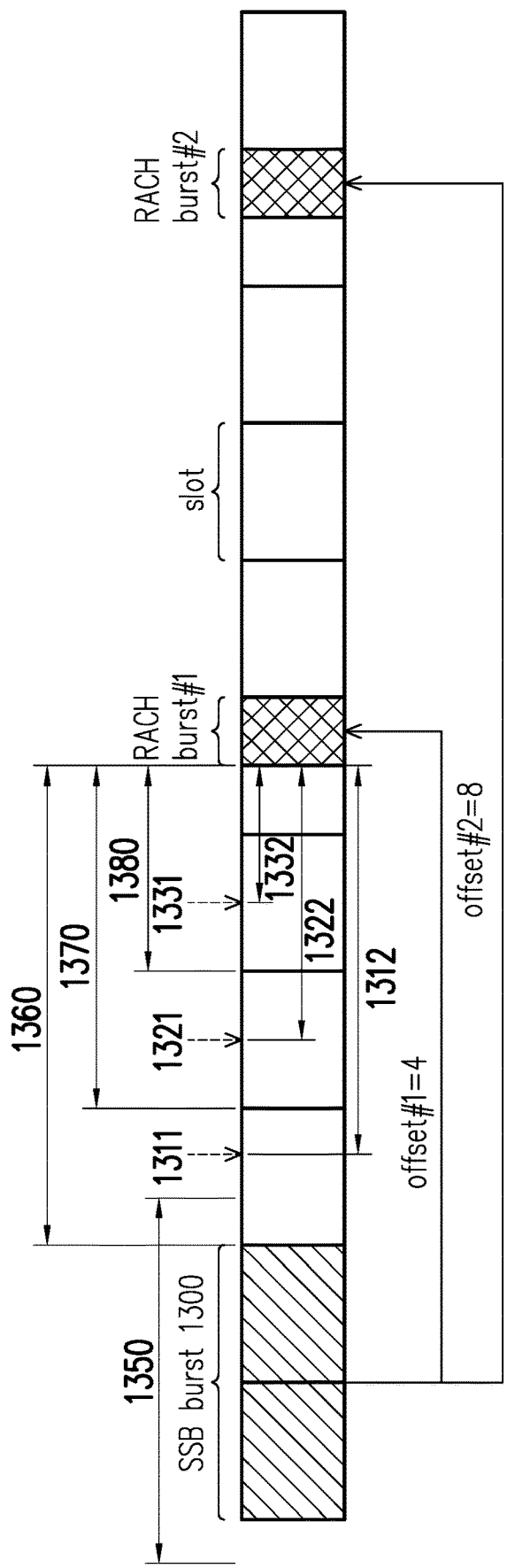
FIG. 13 is a schematic diagram of performing an LBT procedure before transmitting a RACH burst according to an embodiment of the disclosure.

The UE 200 may perform an LBT procedure before accessing a RACH burst (or transmitting a RACH sequence such as a RAP). FIG. 13 is a schematic diagram of performing an LBT procedure before transmitting a RACH burst #1 (or RACH burst #2) according to an embodiment of the disclosure. The BS 100 may perform an LBT procedure before transmitting a RACH burst (e.g., RACH burst #1 or #2) associated with the SSB burst 1300. After detecting the SSB burst 1300, the UE 200 may access the RACH burst #1 based on a channel access type determined by the BS 100 or according to a pre-defined rule, wherein each of the channel access types may respectively correspond to different types of LBT procedure, including type I LBT procedure, type II LBT procedure, and type III LBT procedure. The channel access type or the type of the LBT procedure may be configured via an LBT type indicator including in a higher layer signal from the BS 100. The UE 200 may receive the LBT type indicator from the BS 100 and may perform an LBT procedure for a RACH burst according to the LBT type indicator.

The type I LBT procedure is performed by sensing the channel (e.g., RACH burst #1) for a long sensing interval, wherein the long sensing interval may be determined according to a channel access priority class of the channel as shown on Table 5, and the channel access priority class may indicate a range of contention window (CW) size and/or a maximum channel occupancy time (COT). The channel access priority class of the RACH burst #1 may be determined by the BS 100 or according to a pre-defined rule.

TABLE 5

| channel access priority class | CW size | | maximum COT |
| --- | --- | --- | --- |
| | minimum value (CWmin) | maximum value (CWmax) | |
| 1 | 3 | 7 | 2 ms |
| 2 | 7 | 15 | 3 ms |
| 3 | 15 | 1023 | 6 ms |
| 4 | 15 | 1023 | 10 ms |

In an embodiment, the UE 200 may perform a type I LBT procedure for the RACH burst #1 in response to not receiving the SSB burst 1300 during an expected time interval 1350. The reason to use the long sensing interval for detecting the RACH burst #1 is that the UE 200 may not capable of locating the resource location of the RACH burst #1 accurately since the SSB burst 1300 associated with the RACH burst #1 has not been detected by the UE 200.

After detecting the RACH burst #1 by using the long sensing interval, the UE 200 may transmit or receive a first RACH sequence via the RACH burst #1. If the RACH burst #1 is unavailable to the UE 200 (e.g., due to an LBT failure), the UE 200 may transmit or receive a second RACH sequence via the RACH burst #2 in response to the RACH burst #2 is available to the UE 200, wherein the first RACH sequence and the second RACH sequence may correspond to the same SSB burst 1300, and the second RACH sequence may be the same as or different from the first RACH burst sequence. For example, if the first RACH sequence is the RACH sequence #0 as shown in Table 3, the second RACH sequence may be one of the RACH sequence #0 and the RACH sequence #1 as shown in Table 3.

In an embodiment, the SSB burst 1300 is detected by the UE 200 during the expected time interval 1350. That is, the UE 200 may determine that a RACH burst (e.g., RACH burst #1) associated with the SSB burst 1300 is available. If the UE 200 determines that the RACH burst #1 is available to the UE 200, the UE 200 may perform the type I LBT procedure for the RACH burst #1 in response to not receiving a DL signal before accessing the RACH burst #1. Specifically, the UE 200 may sense the RACH burst #1 by using a long sensing interval in response to not receiving a DL signal (e.g., system information or reference signal) during a time interval 1360 between the SSB burst 1300 and the RACH burst #1.

In an embodiment, the UE 200 may perform the type I LBT procedure for the RACH burst #1 in response to receiving a DL signal before accessing the RACH burst #1. Specifically, the UE 200 may sense the RACH burst #1 by using the long sensing interval in response to receiving a DL signal 1311, wherein a time gap 1312 between the DL signal 1311 and the RACH burst #1 is greater than a time interval 1370. The time interval 1370 may be, for example, 25 us, but the disclosure is not limited thereto.

The type II LBT procedure is performed by sensing the channel (e.g., RACH burst #1) for a short sensing interval.

In an embodiment, the BS 100 may occupy a channel with a duration (e.g., COT=10 ms) by transmitting a DL signal after a successful LBT procedure for the SSB burst 1300. The UE 200 may perform the type II LBT procedure for the RACH burst #1 in response to receiving a DL signal 1321 before accessing the RACH burst #1. Specifically, the UE 200 may sense the RACH burst #1 by using the short sensing interval in response to receiving a DL signal 1321, wherein a time gap 1322 between the DL signal 1321 and the RACH burst #1 is greater than a time interval 1380 but less than the time interval 1370. The time interval 1380 may be, for example, 16 us, but the disclosure is not limited thereto. The reason to use the short sensing interval for detecting the RACH burst #1 is that the UE 200 may be capable to estimate that the RACH burst #1 is located within a known COT configured by the BS 100.

The type III LBT procedure means not performing any LBT procedure for the channel (e.g., RACH burst #1). In an embodiment, The UE 200 may perform the type III LBT procedure for the RACH burst #1 in response to receiving a DL signal 1331 before accessing the RACH burst #1. Specifically, the UE 200 may not sense the RACH burst #1 in response to receiving a DL signal 1331, wherein a time gap 1332 between the DL signal 1331 and the RACH burst #1 is less than a time interval 1380.

Figure 14:
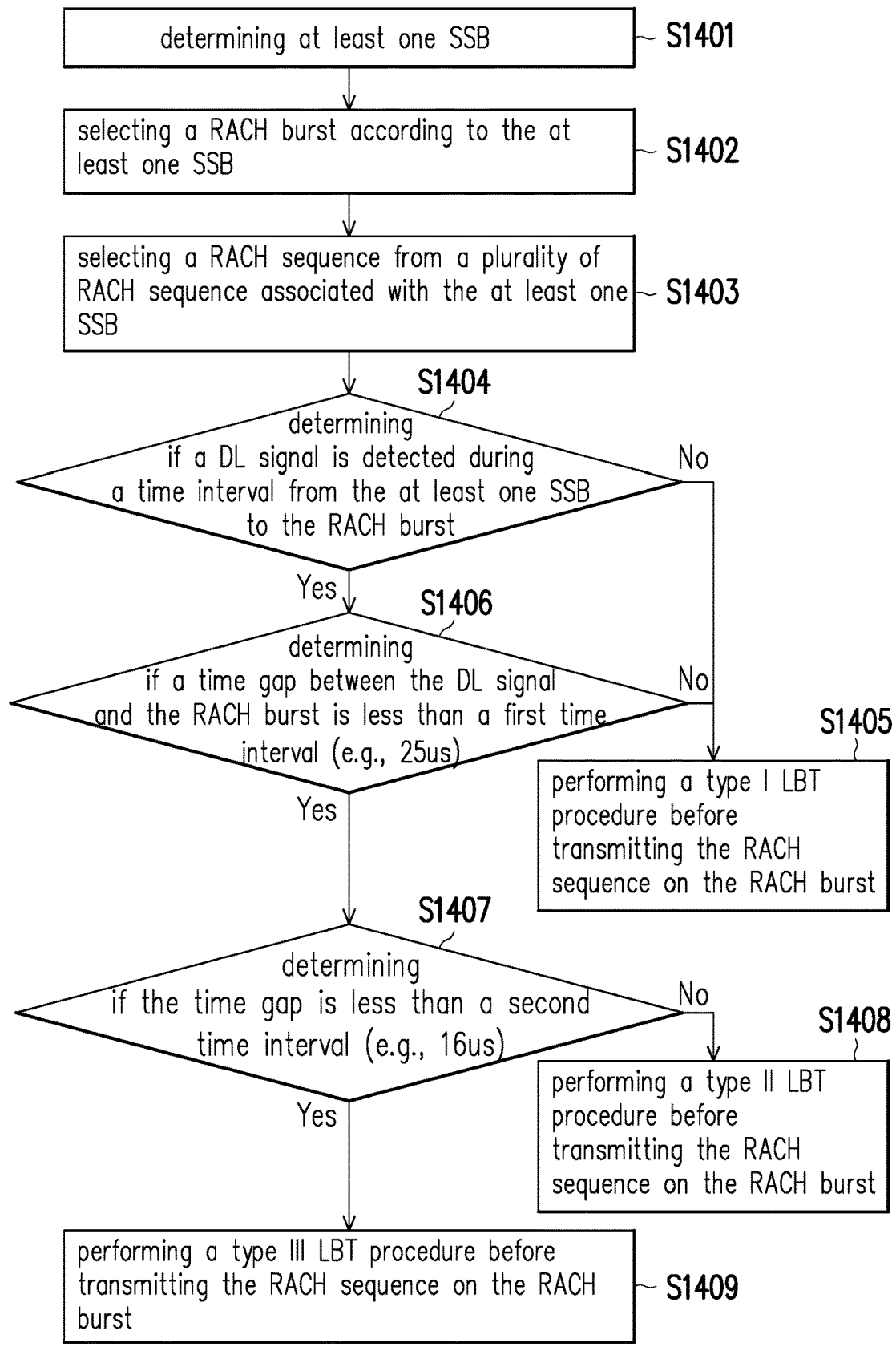
FIG. 14 is a flow chart of a method for determining the type of the LBT procedure according to an embodiment of the disclosure.

FIG. 14 is a flow chart of a method for determining the type of the LBT procedure according to an embodiment of the disclosure, wherein the method may be implemented by the UE 200. In step S1401, a UE determines at least one SSB (or SSB burst). In step S1402, the UE selects a RACH burst according to the at least one SSB. In step S1403, the UE selects a RACH sequence (or RAP) from a plurality of RACH sequence (or RAP) associated with the at least one SSB. In step S1404, the UE determines if a DL signal is detected during a time interval from the at least one SSB to the RACH burst. If the DL signal is been detected, proceeding to step S1406. If the DL signal is not been detected, proceeding to step S1405. In step S1405, the UE performs a type I LBT procedure before transmitting the RACH sequence on the RACH burst. In step S1406, the UE determines if a time gap between the DL signal and the RACH burst is less than a first time interval (e.g., 25 us). If the time gap is less than the first time interval, proceeding to step S1407. If the time gap is greater than or equal to the first time interval, proceeding to step S1405. In step S1407, the UE determines if the time gap is less than a second time interval (e.g., 16 us). If the time gap is less than the second time interval, proceeding to step S1409. If the time gap is greater than or equal to the second time interval, proceeding to step S1408. In step S1408, the UE performs a type II LBT procedure before transmitting the RACH sequence on the RACH burst. In step S1409, the UE performs a type III LBT procedure before transmitting the RACH sequence on the RACH burst.

Figure 15:
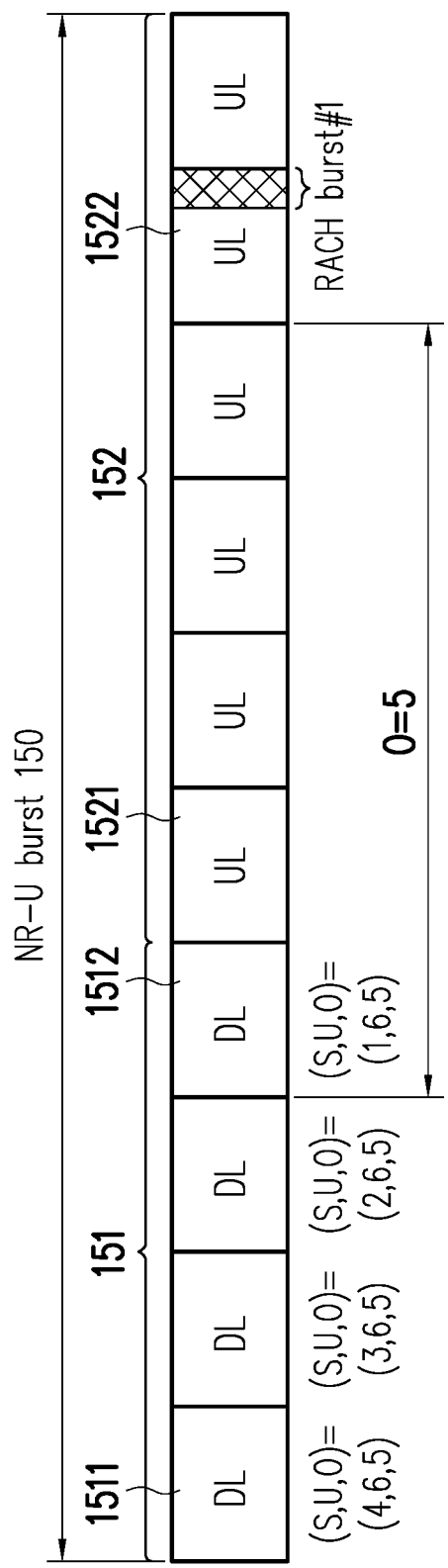
FIG. 15 is a schematic diagram of determining a RACH burst based on a NR-U burst according to an embodiment of the disclosure.

FIG. 15 is a schematic diagram of determining a RACH burst #1 based on a NR-U burst 150 according to an embodiment of the disclosure. The UE 200 may obtain a DL signal (e.g., pre-determined or obtained from a physical layer signal or a higher layer signal transmitted by the BS 100) associated with the resource location of the RACH burst #1 from any of the slots (e.g., slot 1511, slot 1512, . . . etc.) within the DL burst 151 of the NR-U burst 150, and may determine the resource location of the RACH burst #1 according to the indication from the DL signal, wherein the DL signal may be a physical layer signal such as DCI or a slot format indicator (SFI). The DCI may be represented as a form of "(S, U, O)". "S" represents a shift indicator for indicating the number of slots from the slot carrying the DCI to the first slot 1521 of the uplink (UL) burst 152 in the NR-U burst 150, or indicating the number of slots from the slot carrying the DCI to the start of the UL burst 152. "U" represents a UL burst duration for indicating the number of the UL slots (e.g., consecutive UL slots), wherein said UL slots may be allocated within the same UL burst 152 or may share the same COT. "O" represents an offset (e.g., O=5) for indicating the number of slots from the slot associated with the reference resource location to the resource location of the RACH burst #1, wherein the reference resource location may be defined as the first slot of the UL burst 152 (i.e., slot 1521) in the NR-U burst 150 in this embodiment. However, the disclosure is not limited thereto. For example, the reference resource location may also be defined as one of the followings: the first slot (e.g., slot 1511) of the DL burst 151, the last slot (e.g., slot 1512) of the DL burst 151, or the first slot of the NR-U burst 150 (e.g., slot 1511).

In an embodiment, the DCI may include information related to a DL burst duration for indicating the number of the DL slots (e.g., consecutive DL slots), wherein said DL slots may be allocated within the same DL burst 151 or may share the same COT.

The UE 200 may determine the reference resource location according to the shift indicator "S", and may determine the resource location of the RACH burst #1 according to the reference resource location and the offset "O". For example, the DL slot 1511 may carry the DCI "(S, U, O)=(4, 6, 4)", wherein "S=4" indicates that the number of slots from the slot 1511 carrying the DCI to the first slot of the UL burst 152 is equal to four, "U=6" indicates that the number of the UL slots is equal to six, and "O=5" indicates that the time interval from the slot 1521 associated with the reference resource location to the slot 1522 carrying the RACH burst #1 is equal to five. The UE 200 may transmit a RACH sequence within the RACH burst #1 with or without performing an LBT procedure in advanced.

In an embodiment, the UE 200 may determine an available (or valid) RACH burst (e.g., RACH burst #1) corresponding to the DCI exists in response to receiving (or detecting) the DCI associated with the RACH burst #1. By contrast, The UE 200 may determine an available RACH burst not exists in response to not receiving (or detecting) the DCI associated with the RACH burst. The BS 100 may perform an LBT procedure before transmitting the DCI, and may transmit the DCI to the UE 200 in response to the LBT procedure is successful.

In an embodiment, the DCI carried by, for example, the slot 1512 may include an enable indicator. The enable indicator could be utilized to indicate whether the RACH burst in the NR-U burst 150 is enabled (or available to the UE 200). For example, if the enable indicator is equal to zero, the UE 200 would determine that the RACH burst (e.g., RACH burst #1 and/or RACH burst #2) associated with the NR-U burst 150 is unavailable. On the other hand, if the enable indicator is equal to one, the UE 200 would determine that the RACH burst associated with the NR-U burst 150 is available.

Figure 16:
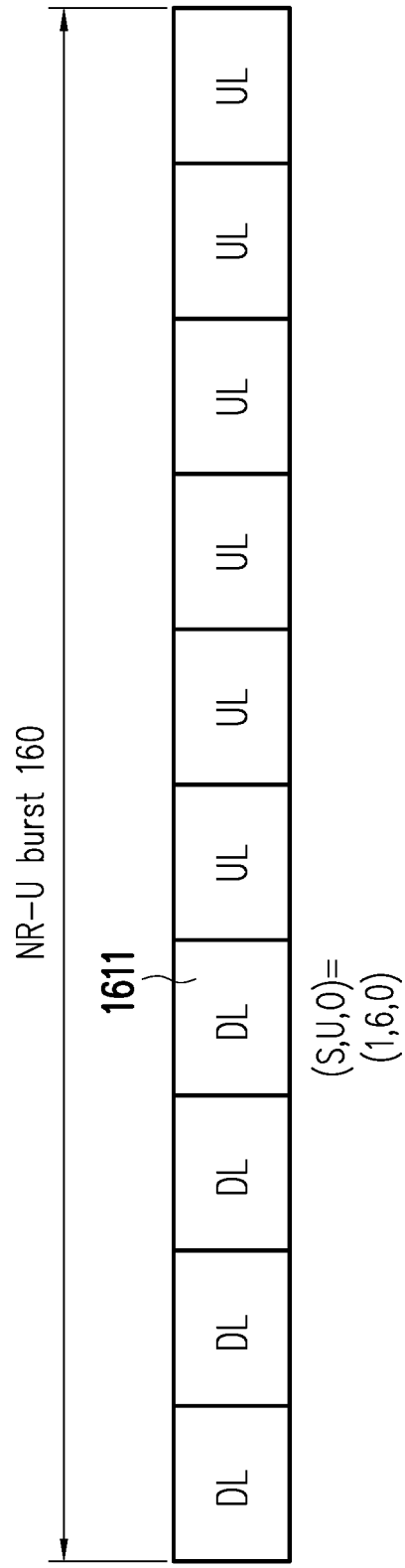
FIG. 16 is a schematic diagram of downlink control information (DCI) indicating that no RACH burst available to the UE is enabled in the NR-U according to an embodiment of the disclosure.

FIG. 16 is a schematic diagram of DCI indicating that no RACH burst available to the UE 200 is enabled in the NR-U burst 160 according to an embodiment of the disclosure. The slot 1611 carries the DCI "(S, U, O)=(1, 6, 0)" in this embodiment, wherein offset "O=0" may indicate that the RACH burst available to the UE 200 does not been enable or does not exist in the NR-U burst 160.

Figure 17:
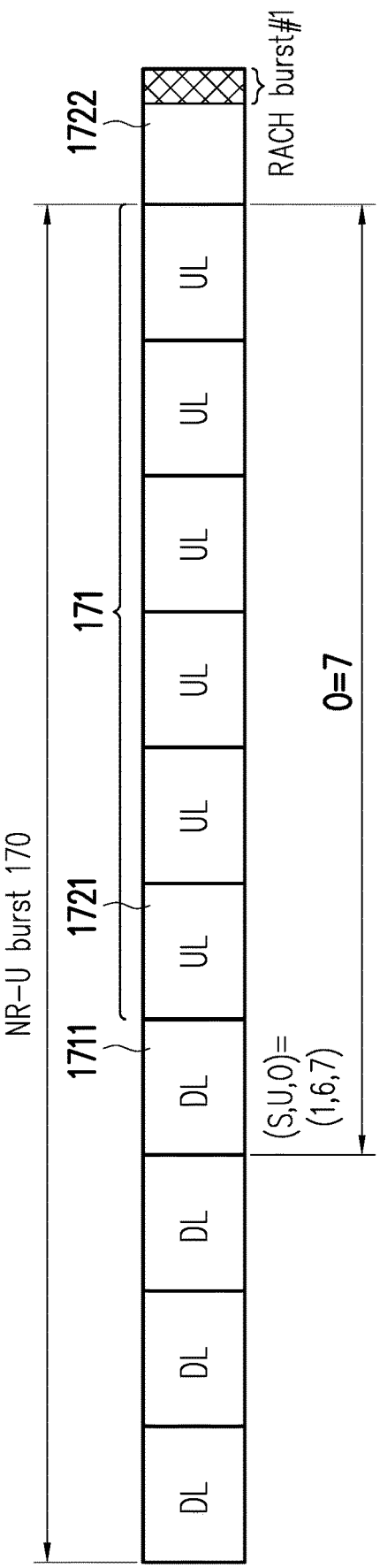
FIG. 17 is a schematic diagram of DCI indicating that a RACH burst is outside the NR-U according to an embodiment of the disclosure.

FIG. 17 is a schematic diagram of DCI indicating that a RACH burst #1 is outside the NR-U burst 170 according to an embodiment of the disclosure. The slot 1711 carries the DCI "(S, U, O)=(1, 6, 7)" in this embodiment, wherein UL burst duration "U=6" may indicate the number of the UL slots (e.g., consecutive UL slots) is equal to six, and offset "O=7" may indicate the number of slots from the slot associated with the reference resource location (i.e., the first slot 1721 of the UL burst 171) to the resource location of the RACH burst #1 (i.e., slot 1722) is equal to seven. That is, the time interval between the slot 1721 and the slot 1722 carrying the RACH burst #1 is equal to seven. Therefore, the resource location of the RACH burst #1 is outside the UL burst 171.

Figure 18:
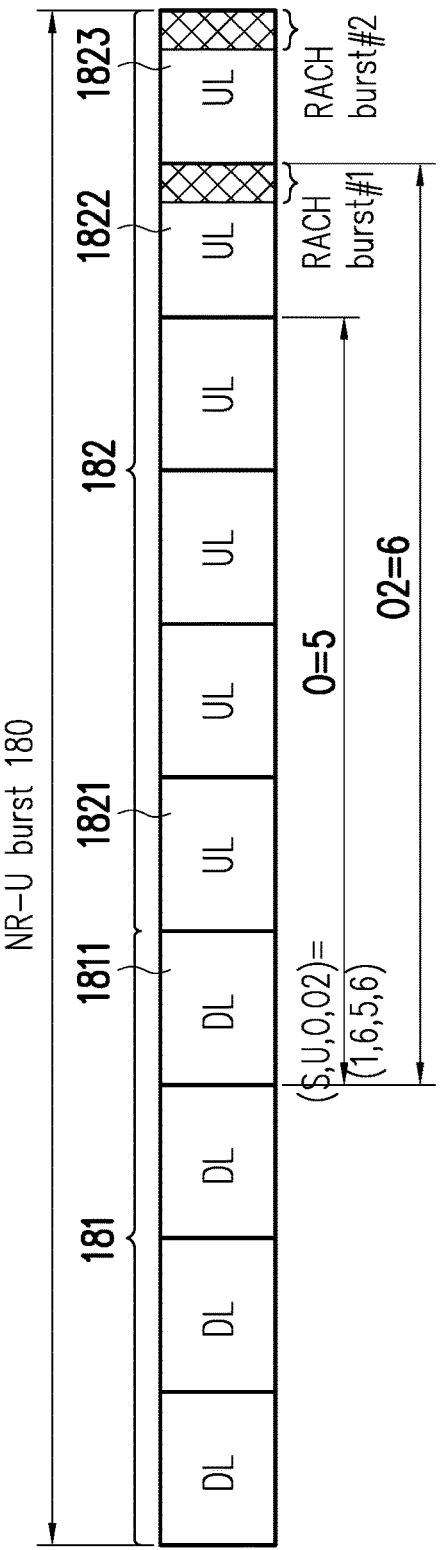
FIG. 18 is a schematic diagram of determining at least two RACH burst based on a NR-U burst according to an embodiment of the disclosure.

FIG. 18 is a schematic diagram of determining at least two RACH burst (i.e., RACH burst #1-#2) based on a NR-U burst 180 according to an embodiment of the disclosure. In an embodiment, the DCI carried by the slot 1811 of the DL burst 181 in the NR-U burst 180 may be represented as a form of "(S, U, O, O2)". "S" represents a shift indicator for indicating the number of slots from the slot carrying the DCI to the slot associated with the reference resource location (i.e., first slot 1812 of the UL burst 182 in the NR-U burst 180). "U" represents a UL burst duration for indicating the number of the UL slots. "O" represents an offset (e.g., O=5) for indicating the number of slots from the slot associated with the reference resource location to the resource location of the RACH burst #1, and "O2" represents an offset (e.g., O2=6) for indicating the number of slots from the slot associated with the reference resource location to the resource location of the RACH burst #2.

The UE 200 may determine the reference resource location according to the shift indicator "S", determine the resource location of the RACH burst #1 according to the reference resource location and the offset "O", and determine the resource location of the RACH burst #2 according to the reference resource location and the offset "O2". For example, the DL slot 1811 may carry the DCI "(S, U, O, O2)=(4, 6, 5, 6)", wherein "S=4" indicates that the number of slots from the slot 1811 carrying the DCI to the first slot of the UL burst 182 is equal to four, "U=6" indicates that the number of the UL slots is equal to six, "O=5" may indicate that the number of slots from the slot 1821 associated with the reference resource location to the slot 1822 carrying the RACH burst #1 is equal to five, and "O2=6" may indicate that the number of slots from the slot 1821 associated with the reference resource location to the slot 1823 carrying the RACH burst #2 is equal to six.

In an embodiment, the offset "O" and/or offset "O2" may be pre-configured to the UE 200 via an offset table. The offset table may include a set of offsets, wherein each offset in the set indicates a time/frequency distance or location associated with at least one RACH burst. A higher layer signal (or DCI) from the BS 100 may be used for indicating an offset from the offset table, and The UE 200 may determine to access the corresponding RACH burst accordingly. The offset table may be, for example, Table 6 as shown below, wherein "V" represents an indication for indicating a set of offsets respectively corresponding to available RACH bursts, and the UE 200 may obtain the indication "V" from a higher layer signal transmitted by the BS 100. It should be noted that the indication "V" may be carried by an N-bit message, the disclosure is not limited thereto.

TABLE 6

| V | {offset} (O and/or O2) | Description |
|---|---|---|
| 0 | {0} | No available RACH burst |
| 1 | {4, 8} | 2 RACH bursts are available, wherein offset "O" = 4 and offset "O2" = 8 |
| 2 | {1, 4} | 2 RACH bursts are available, wherein offset "O" = 1 and offset "O2" = 4 |
| 3 | {2} | 1 RACH burst is available, wherein offset "O" = 2 |
| 4 | {1, 3, 5, 7} | 4 RACH bursts are available, wherein offset "O" = 1, offset "O2" = 3, offset "O3" = 5, and offset "O4" = 7 |

FIG. 19 is a schematic diagram of determining at least three RACH burst (i.e., RACH burst #1-#3) based on a NR-U burst 190 according to an embodiment of the disclosure. In an embodiment, the DCI carried by the slot 1911 of the DL burst 191 in the NR-U burst 190 may be represented as a form of "(S, U, O, O #2, O #3)". "S" represents a shift indicator for indicating the number of slots from the slot carrying the DCI to the first slot 1921 of the UL burst 192 in the NR-U burst 190. "U" represents a UL burst duration for indicating the number of the UL slots. "O" represents an offset (e.g., O=5) for indicating the number of slots from the slot associated with the reference resource location to the slot associated with the resource location of the RACH burst #1, "O #2" represents an offset (e.g., O #2=1) for indicating the number of slots from the slot associated with the resource location of the RACH burst #1 to the slot associated with the resource location of the RACH burst #2, and "O #3" represents a third offset (e.g., O #3=1) for indicating the number of slots from the slot associated with the resource location of the RACH burst #2 to the slot associated with the resource location of the RACH burst #3.

The offsets "O #2" and "O #3" may be pre-determined or obtained from a higher layer signal transmitted by the BS 100. After determining the resource locations of RACH burst #1 according to the offset "O", the UE may determine the resource location of RACH burst #2 (which is associated with slot 1923) according to the offset "O #2" and the resource location of the RACH burst #1 (which is associated with slot 1922). "O #2=1" may indicate that the number of slots from the slot 1922 associated with RACH burst #1 to the slot 1923 associated with RACH burst #2 is equal to one.

After determining the resource location of RACH burst #2 according to the offset "O #2", the UE may determine the resource location of RACH burst #3 (which is associated with slot 1924) according to the offset "O #3" and the resource location of the RACH burst #2 (which is associated with slot 1923). "O #3=1" may indicate that the number of slots from the slot 1923 associated with RACH burst #2 to the slot 1924 associated with RACH burst #3 is equal to one. It should be noted that the offset "O #3" may be the same as or different from the offset "O #2".

In an embodiment, the offset "O #2" and/or offset "O #3" may be pre-configured to the UE 200 via an offset table. The offset table may include a set of offsets, wherein each offset in the set indicates a time/frequency distance or location associated with at least one RACH burst. A higher layer signal (or DCI) from the BS 100 may be used for indicating an offset from the offset table, and The UE 200 may determine to access the corresponding RACH burst accordingly. The offset table may be, for example, Table 7 as shown below, wherein "T" represents an indication for indicating a set of offsets respectively corresponding to available RACH bursts, and the UE 200 may obtain the indication "T" from a higher layer signal transmitted by the BS 100. It should be noted that the indication "T" may be carried by an N-bit message, the disclosure is not limited thereto.

TABLE 7

| V | {offset}<br>(O#2 and/or O#3) | Description |
|---|---|---|
| 0 | {0} | No next available RACH burst |
| 1 | {1} | 2 RACH bursts are available, wherein offset "O#2" = 4 |
| 2 | {1, 4} | 3 RACH bursts are available, wherein offset "O#2" = 1 and offset "O#3" = 4 |
| 3 | {2} | 2 RACH burst is available, wherein offset "O#2" = 2 |

FIG. 20 is a schematic diagram of determining at least three RACH bursts (i.e., RACH burst #1-#3) based on a NR-U burst 2000 according to another embodiment of the disclosure. In an embodiment, the DCI carried by the slot 2011 of the DL burst 2010 in the NR-U burst 2000 may be represented as a form of "(S, U, O, O #4, N)". "S" represents a shift indicator for indicating the number of slots from the slot carrying the DCI to the first slot 2021 of the UL burst 2020 in the NR-U burst 2000. "U" represents a UL burst duration for indicating the number of the UL slots. "O" represents an offset (e.g., O=5) for indicating the number of slots from the slot associated with the reference resource location to the resource location of the RACH burst #1. "O #3" represents an offset (e.g., O #3=1) for indicating the number of slots between two of adjacent RACH bursts, wherein the adjacent RACH bursts may refer to two RACH bursts which have no other RACH burst in between. "N" represents the number of RACH bursts which are available to (or valid to) the UE 200, wherein the number of RACH bursts is equal to three in this embodiment, but the disclosure is not limited thereto.

After determining the resource location of RACH burst #1, the UE 200 may determine the resource locations of RACH bursts #2 and RACH bursts #3 according to the offset "O #3" and the number of RACH bursts "N". For example, "O #3=1" may indicate that the number of slots between the slot 2022 associated with the RACH burst #1 and the slot 2023 associated with the RACH burst #2 is equal to one slot, and may indicate that the number of slots between the slot 2023 associated with the RACH burst #2 and the slot 2024 associated with the RACH burst #3 is equal to one slot.

Figure 21:
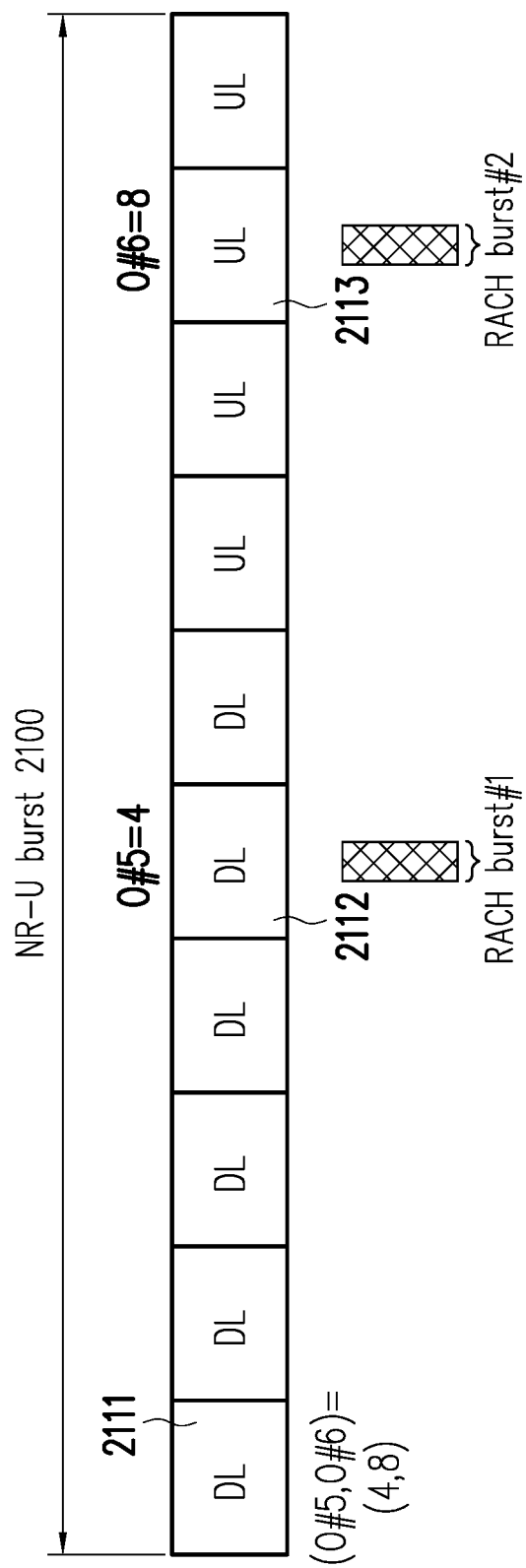
FIG. 21 is a schematic diagram of determining a RACH burst based on an offset according to an embodiment of the disclosure.

FIG. 21 is a schematic diagram of determining a RACH burst (e.g., RACH burst #1 and/or RACH burst #2) based on an offset (e.g., offset "O #5" and/or offset "O #6") according to an embodiment of the disclosure. A higher layer signal (e.g., system information) from the BS 100 may indicate at least one offset, wherein the at least one offset may indicate the number of slots from the first slot of the NR-U burst 2100 to the slot associated with the resource location of a RACH burst. For example, the slot 2111 may carry DCI "(O #5, O #6)=(4, 8)", wherein the offset "O #5=4" may indicate the number of slots from the slot 2111 to the slot 2112 carrying the RACH burst #1, and the offset "O #6=5" may indicate the number of slots from the slot 2111 to the slot 2113 carrying the RACH burst #2.

In an embodiment, the UE 200 may perform an LBT procedure for a RACH burst based on the validation of the RACH burst. For example, the UE 200 may check whether the RACH burst #1 and/or RACH burst #2 is available. If the RACH burst #1 is available, the UE 200 may perform an LBT procedure for the RACH burst #1 and may transmit a first RACH sequence in the RACH burst #1. If the RACH burst #1 is unavailable, the UE 200 may not perform an LBT procedure for the RACH burst #1 and may not transmit an RACH sequence in the RACH burst #1. The UE 200 may further check whether the RACH burst #2 is available. If the RACH burst #2 is available, the UE 200 may perform an LBT procedure for the RACH burst #2 and may transmit a second RACH sequence in the RACH burst #2. It should be noted that the second RACH sequence which the UE 200 intends to transmit in the RACH burst #2 may be the same as or different from the first RACH sequence which the UE 200 intends to transmit in the RACH burst #1.

Figure 22:
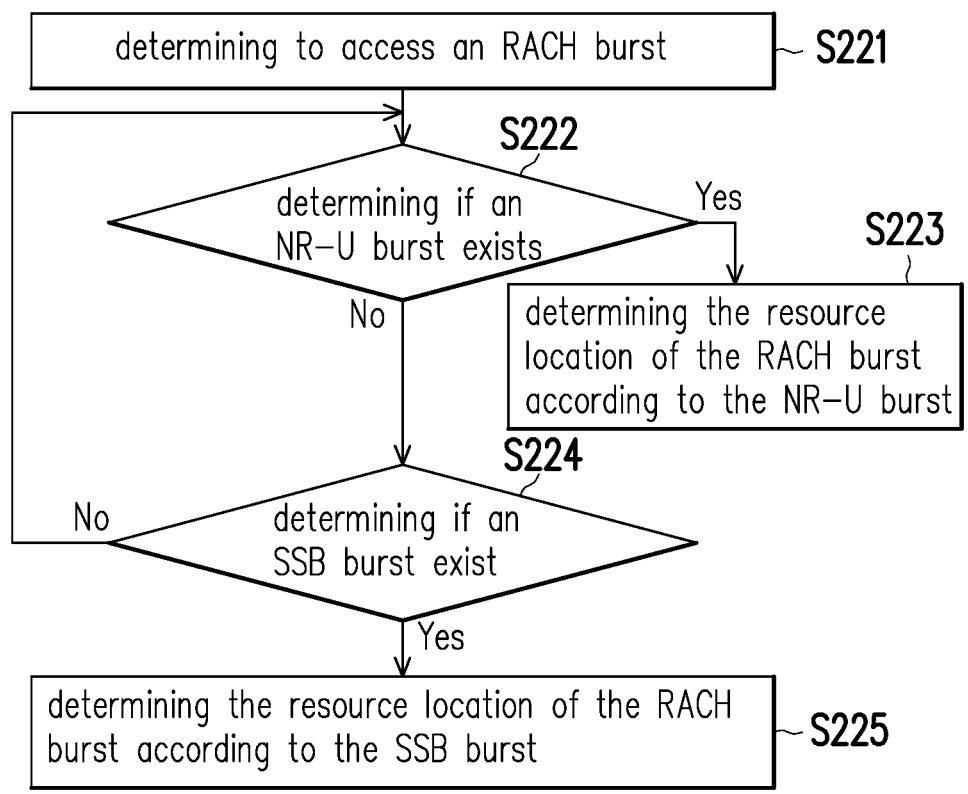
FIG. 22 is a flow chart of a method for determining a RACH burst based on a NR-U burst or a SSB burst according to an embodiment of the disclosure.

FIG. 22 is a flow chart of a method for determining a RACH burst based on a NR-U burst or a SSB burst according to an embodiment of the disclosure, wherein the method may be implemented by the UE 200. In step S221, a UE determines to access an RACH burst so as to, for example, transmit an RACH sequence via the RACH burst. In step S222, the UE determines if an NR-U burst exists. If the NR-U burst exists, proceeding to the step S223. If the NR-U burst does not exist, proceeding to the step S224. In step S223, the UE determines the resource location of the RACH burst according to the NR-U burst. That is, the UE may determine the resource location of the RACH burst in response to receiving the NR-U burst. In step S224, the UE determines if an SSB burst (or SSB) exist. If the SSB burst exists, proceeding to the step S225. If the SSB burst does not exist, proceeding to the step S222. In step S225, the UE determines the resource location of the RACH burst according to the SSB burst. That is, the UE may determine the resource location of the RACH burst in response to not receiving the NR-U burst. In an embodiment, the NR-U burst and the SSB burst received by the UE may indicate the same RACH burst, or may indicate different RACH bursts respectively.

Figure 23:
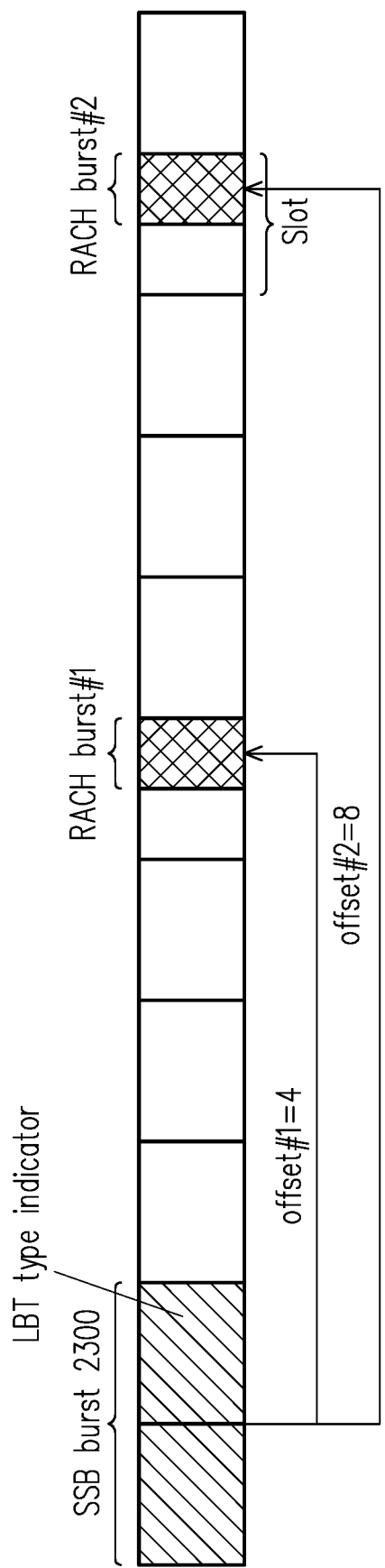
FIG. 23 is a schematic diagram of determining the LBT type for a RACH burst based on an SSB burst according to an embodiment of the disclosure.

FIG. 23 is a schematic diagram of determining the LBT type for a RACH burst (e.g., RACH burst #1 and/or RACH burst #2) based on an SSB burst 2300 according to an embodiment of the disclosure. The SSB burst 2300 (or SSB associated with the SSB burst 2300) may carry an LBT type indicator for indicating what type of an LBT procedure should be performed for an RACH burst. For example, the LBT type indicator may be a one-bit message indicating an LBT type for any of the RACH burst corresponding to the SSB burst 2300, such as RACH burst #1 or RACH burst #2 as shown in FIG. 23. The UE 200 may perform an LBT procedure (e.g., a type I, II, or III LBT procedure) according to the LBT type indicator before access RACH burst #1 and/or RACH burst #2. For another example, the LBT type indicator may be a N-bit (e.g., N=2) message, wherein the first bit of the LBT type indicator indicates an LBT type for the RACH burst #1 and the second bit of the LBT type indicator indicates an LBT type for the RACH burst #2. The UE 200 may perform an LBT procedure according to the first bit of the LBT type indicator before accessing the RACH burst #1, and may perform an LBT procedure according to the second bit of the LBT type indicator before accessing the RACH burst #2.

Figure 24:
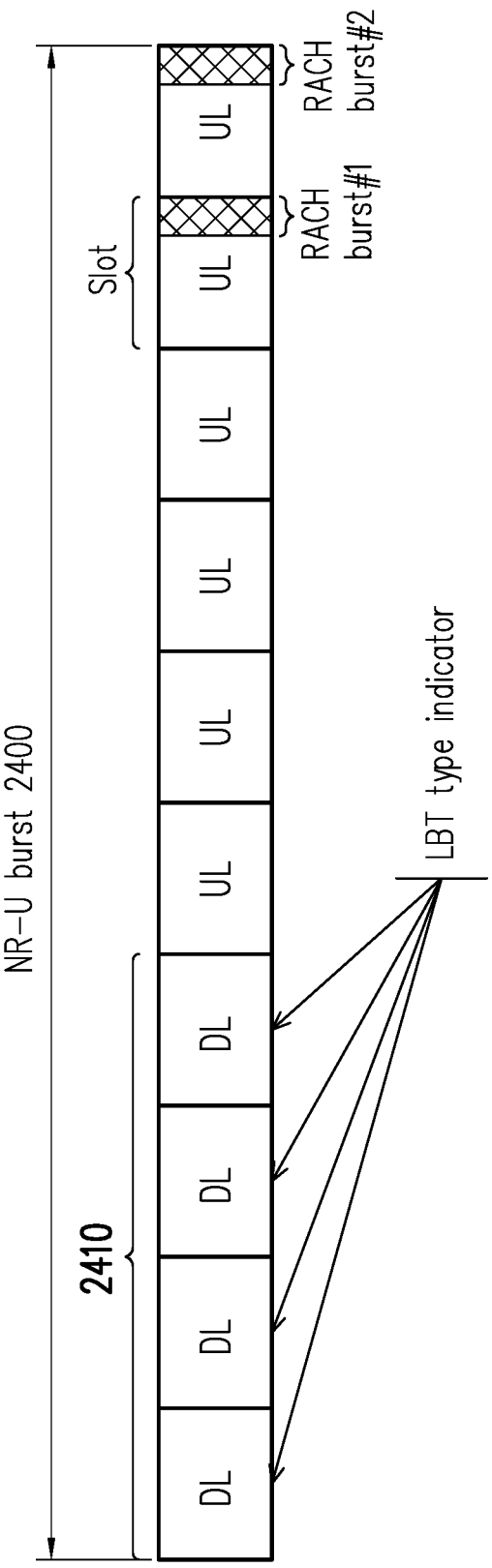
FIG. 24 is a schematic diagram of determining the LBT type for a RACH burst based on an NR-U burst according to an embodiment of the disclosure.

FIG. 24 is a schematic diagram of determining the LBT type for a RACH burst (e.g., RACH burst #1 and/or RACH burst #2) based on an NR-U burst 2400 according to an embodiment of the disclosure. At least one slot of the DL burst 2410 in the NR-U burst 2400 may carry an LBT type indicator for indicating what type of an LBT procedure should be performed for an RACH burst. For example, the LBT type indicator may be a one-bit message indicating an LBT type for any of the RACH burst corresponding to the NR-U burst 2400, such as RACH burst #1 or RACH burst #2 as shown in FIG. 24. The UE 200 may perform an LBT procedure (e.g., a type I, II, or III LBT procedure) according to the LBT type indicator before access RACH burst #1 and/or RACH burst #2. For another example, the LBT type indicator may be a N-bit (e.g., N=2) message, wherein the first bit of the LBT type indicator indicates an LBT type for the RACH burst #1 and the second bit of the LBT type indicator indicates an LBT type for the RACH burst #2. The UE 200 may perform an LBT procedure according to the first bit of the LBT type indicator before accessing the RACH burst #1, and may perform an LBT procedure according to the second bit of the LBT type indicator before accessing the RACH burst #2.

Figure 25:
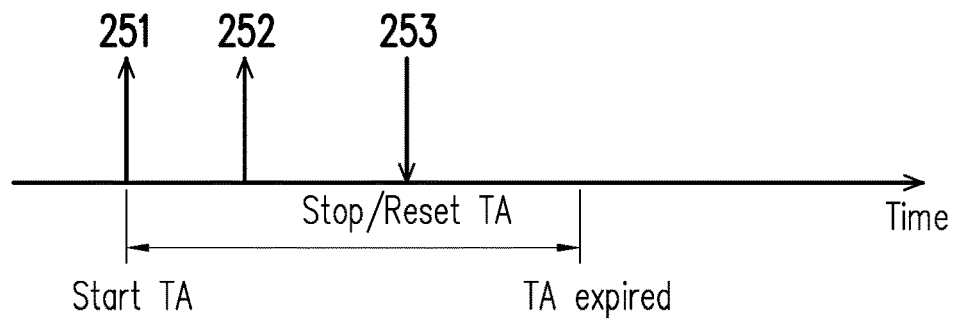
FIG. 25 is a schematic diagram of transmitting a RACH sequence according to an embodiment of the disclosure.

FIG. 25 is a schematic diagram of transmitting a RACH sequence according to an embodiment of the disclosure. The UE 200 may start a timer TA in response to transmitting (or intending to transmit) a RAP or a RACH sequence in a RACH burst at time point 251. The UE 200 may stop or reset the timer TA in response to receiving, before the timer TA expires at time point 253 (e.g., at time point 252), a RAR corresponding to the RAP transmitted at time point 251, or may stop or reset the timer TA in response to expiration of the timer TA. On the other hand, the UE 200 may determine that a RA problem exists in response to the timer TA expiring (e.g., the UE 200 has not received any of a RAR corresponding to the RAP before the timer TA expires. The MAC layer of the UE 200 may indicate that the RA problem exists to an upper layer (e.g., RRC layer) of the UE 200. It should be noted that the UE 200 may intend to transmit more than one RAP during a time interval from the starting of the timer TA to the expiration of the timer TA.

Figure 26:
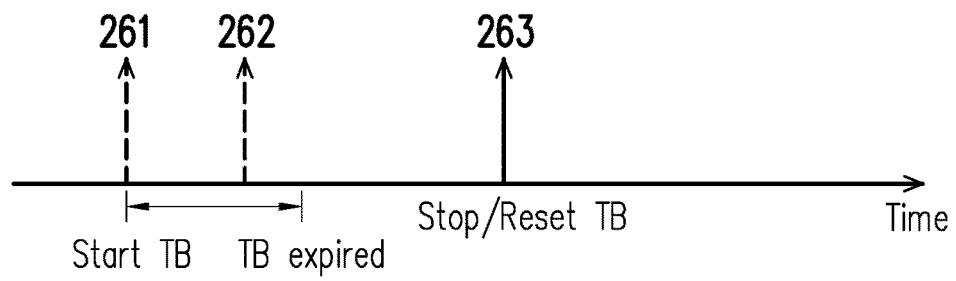
FIG. 26 is a schematic diagram of transmitting a RACH sequence according to another embodiment of the disclosure.

FIG. 26 is a schematic diagram of transmitting a RACH sequence according to another embodiment of the disclosure. The UE 200 may utilize a timer TB for increasing a counter value of a RAP transmission counter. The UE 200 may start the timer TB in response to transmitting (or intending to transmit) a RAP or a RACH sequence in a burst at time point 261. The UE 200 may increase the counter value of the RAP transmission counter in response to the timer TB expiring at time point 262. The UE may then stop or reset the timer TB after the timer TB expires at time point 262. In an embodiment, the UE 200 may increase the counter value of the RAP transmission counter in response to transmitting a RAP successfully in a RACH burst (or intending to transmit the RAP in the RACH burst) at time point 263, and the UE 200 may stop or reset the timer TB in response to transmitting the RAP successfully in a RACH burst at time point 263. It should be noted that the UE 200 may intend to transmit more than one RAP during a time interval from the starting of the timer TB to the expiration of the timer TB.

The RAP transmission counter is utilized for determining if a RA problem exists. For example, the UE 200 may determine a RA problem exists in response to the counter value of the RAP transmission counter exceeding a threshold. The MAC layer of the UE 200 may indicate that the RA problem exists to an upper layer (e.g., RRC layer) of the UE 200.

Figure 27:
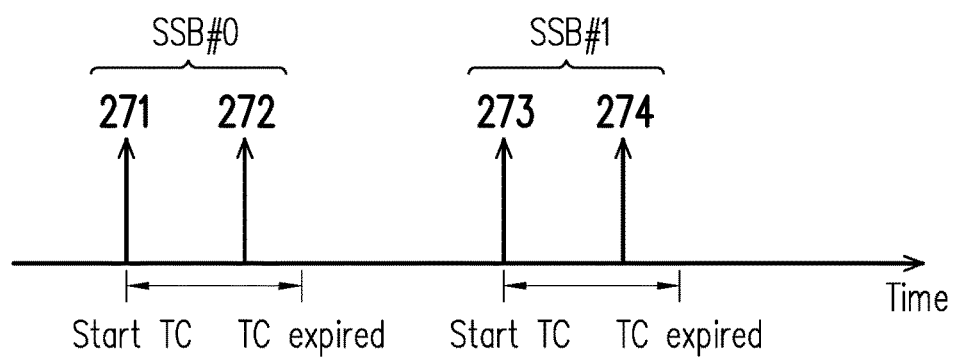
FIG. 27 is a schematic diagram of selecting a RACH sequence based on a SSB according to an embodiment of the disclosure.

FIG. 27 is a schematic diagram of selecting a RACH sequence based on a SSB according to an embodiment of the disclosure. The UE 200 may utilize a timer TC for selecting a RAP (or a RACH sequence). For example, the UE 200 may select, from a plurality of RAP, a RAP according to an index of an SSB #0, wherein the index of the SSB #0 may be a SSB spatial domain correlated (or quasi co-located) with the RACH bursts at time points 271 and 272. Then, the UE 200 may transmit the selected RAP in the RACH burst at time point 271. After intending to transmit the RAP at time pint 271, the UE 200 may transmit a RAP according to the same index (i.e., index of the SSB #0) at time point 272 before the timer TC expires. The UE 200 may stop or reset the timer TC after the timer TC expires. In an embodiment, the UE 200 may transmit, in response to failing to transmit a first RAP at time point 271, a second RAP at time point 272, wherein the second RAP may be the same as or different from the first RAP.

In other words, the UE 200 may transmit a RAP according to an index of the SSB #0 at time point 272, wherein the index of the SSB #0 has been utilized for the last RAP transmission (i.e., the RAP transmission at time point 271), and the time interval between the time point 271 and time point 272 is less than the time interval from the starting of the timer TC to the expiration of the timer TC. That is, the UE 200 may transmit more than one RAPs according to the same SSB index during a time interval from the starting of the timer TC to the expiration of the timer TC, wherein the SSB #0 (or the SSB burst corresponding to the SSB #0) may be spatial domain correlated (or quasi co-located) with the RACH bursts respectively corresponding to the time points 271 and 272. Similarly, the UE 200 may transmit a RAP at time point 273 and a RAP at time point 274 according to the same SSB index (i.e., the index of SSB #1).

In an embodiment, in response to the time interval between the time point 271 and the time point 273 is greater than the time interval from the starting of the timer TC to the expiration of the timer TC, the UE 200 may transmit a first RAP at time point 271 and a second RAP at time point 273, wherein the first RAP and the second RAP may respectively correspond to different indices (i.e., indices of SSB #0 and SSB #1). It should be noted that the first RAP and the second RAP may respectively correspond to different BWPs configured to the UE 200 (as shown in FIG. 11), or may respectively correspond to different sub-bands of a BWP configured to the UE 200 (as shown in FIG. 12).

Figure 28:
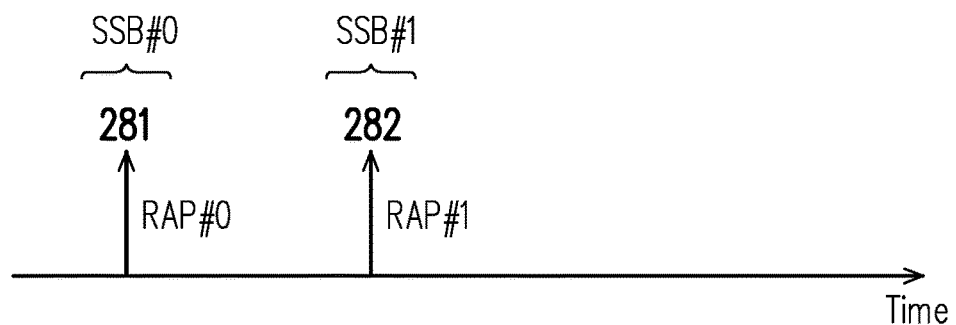
FIG. 28 is a schematic diagram of determining a counter value of a RAP transmission counter according to an embodiment of the disclosure.

FIG. 28 is a schematic diagram of determining a counter value of a RAP transmission counter according to an embodiment of the disclosure. The UE 200 may select a RAP #1 from a plurality of RAPs according to an index of an SSB (or SSB burst), wherein the SSB may be spatial domain correlated (or quasi co-located) with the RACH burst utilized for transmitting the RAP #1 at time point 282. After selecting the RAP #1, the UE 200 may increase a counter value of a RAP transmission counter in response to transmitting the selected RAP #1 successfully at time point 282, or the UE 200 may increase the counter value of the RAP transmission counter in response to intending to transmit the selected RAP #1 at time point 282, whether the RAP #1 is transmitted successfully or un successfully.

In an embodiment, the RAP #0 which the UE 200 intends to transmit at time point 281 and the RAP #1 which the UE 200 intends to transmit at time point 282 may respectively correspond to different SSBs (or SSB bursts). The RAP transmission counter for the SSB #0 (hereinafter referred to as "counter #0") may be the same as or different from the RAP transmission counter for the SSB #1 (herein after referred to as "counter #1"). In an embodiment, the UE 200 may increase the counter value of the counter #0 in response to transmitting the RAP #1 at time point 282. In another embodiment, the UE 200 may reset the counter value of the counter #0 in response to transmitting the RAP #1 at time point 282. In the other embodiment, the counter value of the counter #0 may remain unchanged in response to transmitting the RAP #1 at time point 282. The UE 200 may determine to transmit RAP #1 due to, for example, the transmission of the RAP #0 has failed.

In an embodiment, the UE 200 may determine a RA problem exists in response to the counter value of the counter #0 or counter #1 exceeding a threshold. In another embodiment, the UE 200 may increase the transmission power in response to the counter value of the counter #0 or counter #1 exceeding a threshold.

Figure 29:
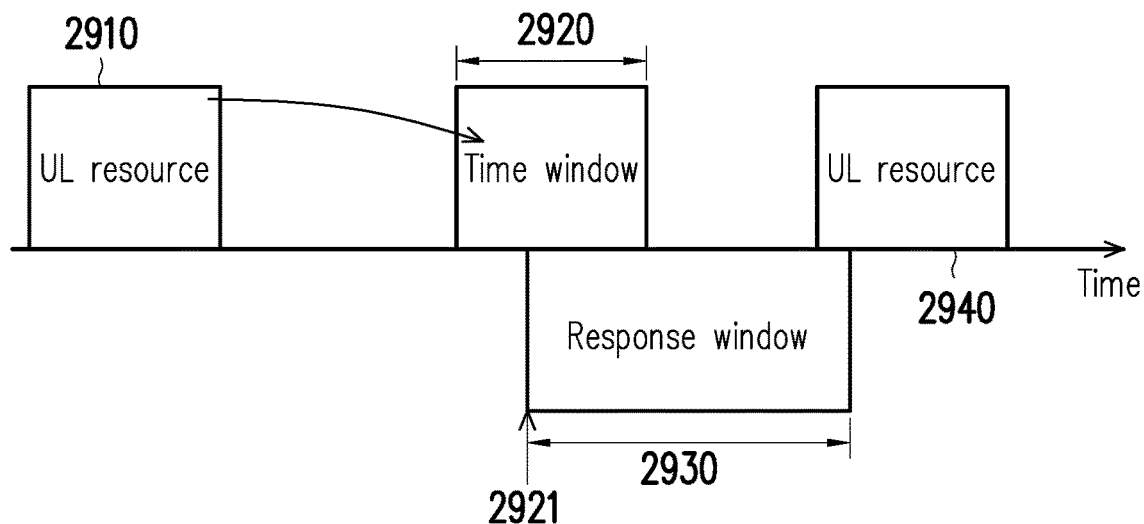
FIG. 29 is a schematic diagram of determining a response window according to an embodiment of the disclosure.

FIG. 29 is a schematic diagram of determining a response window 2930 according to an embodiment of the disclosure. The UE 200 may receive a response message by utilizing the response window 2930 which may be pre-configured by the BS 100. The response window 2930 may be triggered via a DL signal detected by the UE 200. Specifically, the UE 200 may detect a triggering signal during a time window 2920 for response window triggering, wherein the time period 2920 may be pre-configured by the BS 100. The triggering signal may be associated with a UL resource 2910 or a UL signal corresponding to the UL resource 2910. The UE 200 may initiate a timer while starting the time window 2920. If the UE 200 detects the triggering signal during the time window 2920 (e.g., detects the triggering signal at time point 2921), the UE may stop the timer and may start the response window 2930 for monitoring the response message during the response window 2930. That is, the UE may monitor the response message during the response window 2930 according to a detect result of the triggering signal. If the UE 200 does not detect the triggering signal during the time window 2920, the UE 200 may instruct the PHY layer to transmit the UL signal again in the next available UL resource such as UL resource 2940. If the UE 200 does detect the triggering signal during the time window 2920, the UE 200 may start the response window 2930 for monitoring the response message.

In an embodiment, the UL resource 2910 may be a RACH burst, a RACH sequence, or a RAP. The triggering signal associated with the UL resource 2910 may be a DL signal such as DCI scrambled with a RA-RNTI, a SSB, or a reference signal. The response window 2930 may be a RAR window (or a RAR transmission occasion) which is associated with a RAR.

In an embodiment, UL resource 2910 may correspond to a transmission of a physical uplink shared channel (PUSCH). The triggering signal associated with the UL resource 2910 may be a DL signal such as a DCI, a SSB, or a hybrid automatic repeat request (HARQ) feedback. The response window 2930 may be a window for reception of a HARQ acknowledgement (ACK).

In an embodiment, multiple response windows may be pre-configured to the UE 200. The UE 200 may select the response window 2930 from the multiple response windows according to one of the following: a random selection, a UE ID, a transmitted signal corresponding to the response message, LBT results for each of the multiple response windows, a response window ordering, or an indication from the BS 100.

Figure 30:
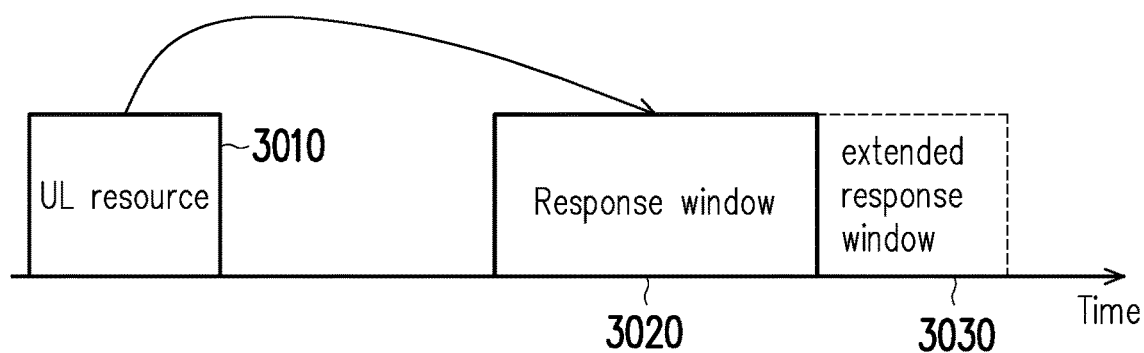
FIG. 30 is a schematic diagram of determining an extended response window according to an embodiment of the disclosure.

FIG. 30 is a schematic diagram of determining an extended response window 3030 according to an embodiment of the disclosure. If the UE 200 does not receive a response message corresponding to the UL resource 3010 during the response window 3020 (e.g., due to an LBT failure at BS 100 side), the UE 200 may extend the response window 3020 so as to generate an extended response window 3030 for detecting the response message corresponding to the UL resource 3010, wherein the extended response window 3030 may be configured by the BS 100.

Figure 31:
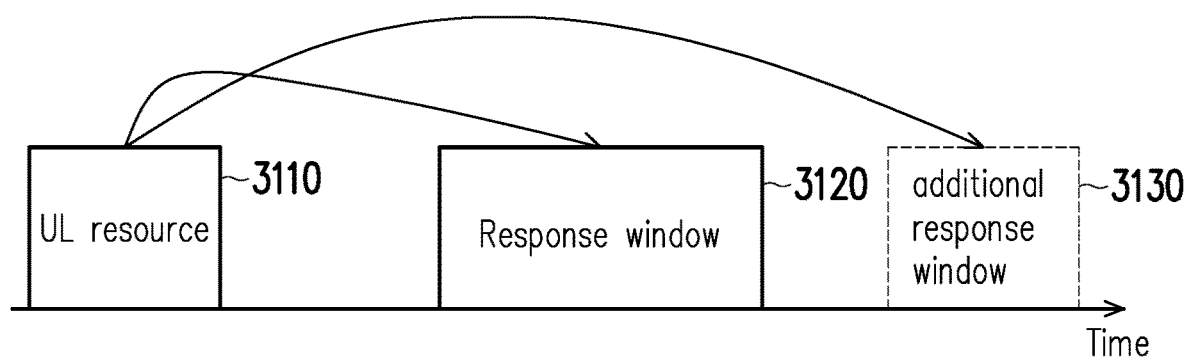
FIG. 31 is a schematic diagram of determining an additional response window according to an embodiment of the disclosure.

FIG. 31 is a schematic diagram of determining an additional response window 3130 according to an embodiment of the disclosure. If the UE 200 does not receive a response message corresponding to the UL resource 3110 during the response window 3120 (e.g., due to an LBT failure at BS 100 side), the UE 200 may generate an additional response window 3130 for detecting the response message corresponding to the UL resource 3110, wherein the additional response window 3130 may be configured by the BS 100.

Figure 32:
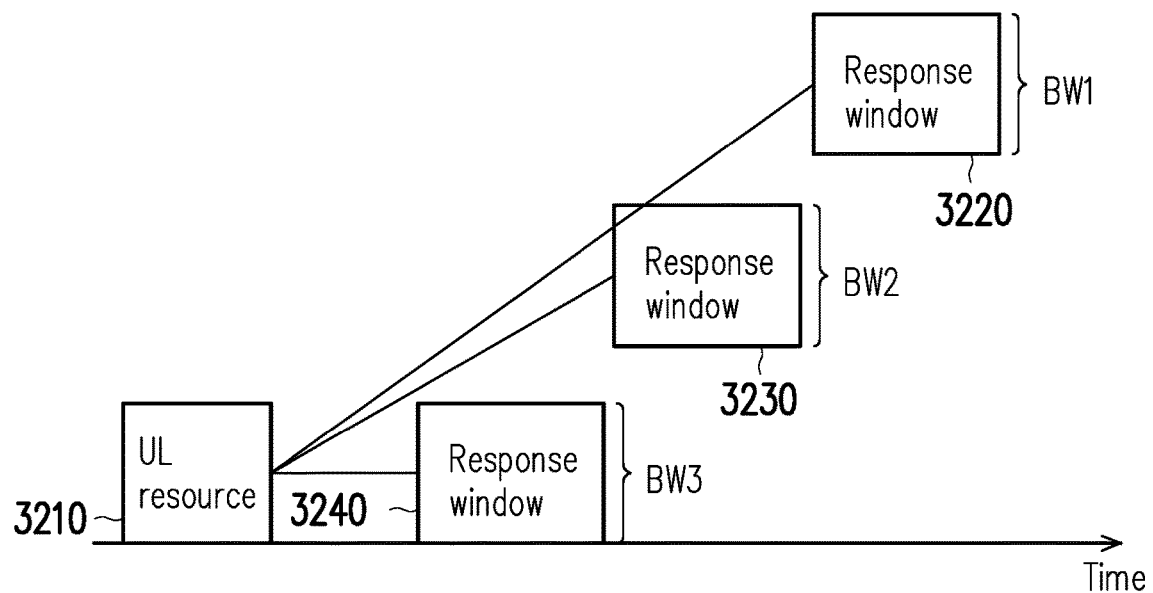
FIG. 32 is a schematic diagram of a mapping relation between a UL resource and multiple response windows according to an embodiment of the disclosure.

FIG. 32 is a schematic diagram of a mapping relation between a UL resource 3210 and multiple response windows according to an embodiment of the disclosure. The UE 200 may monitor the response message via multiple response windows such as response windows 3220, 3230, and/or 3240, wherein each of the response windows may be associated with the same UL resource 3210. The response windows 3220, 3230, and 3240 may respectively correspond to a bandwidth (BW) 1, a BW 2, and a BW 3. Each of the BW 1, BW 2, and BW 3 may correspond to different BWP configured to the UE 200, or may correspond to different sub-bands of a BWP which is configured to the UE 200.

Figure 33:
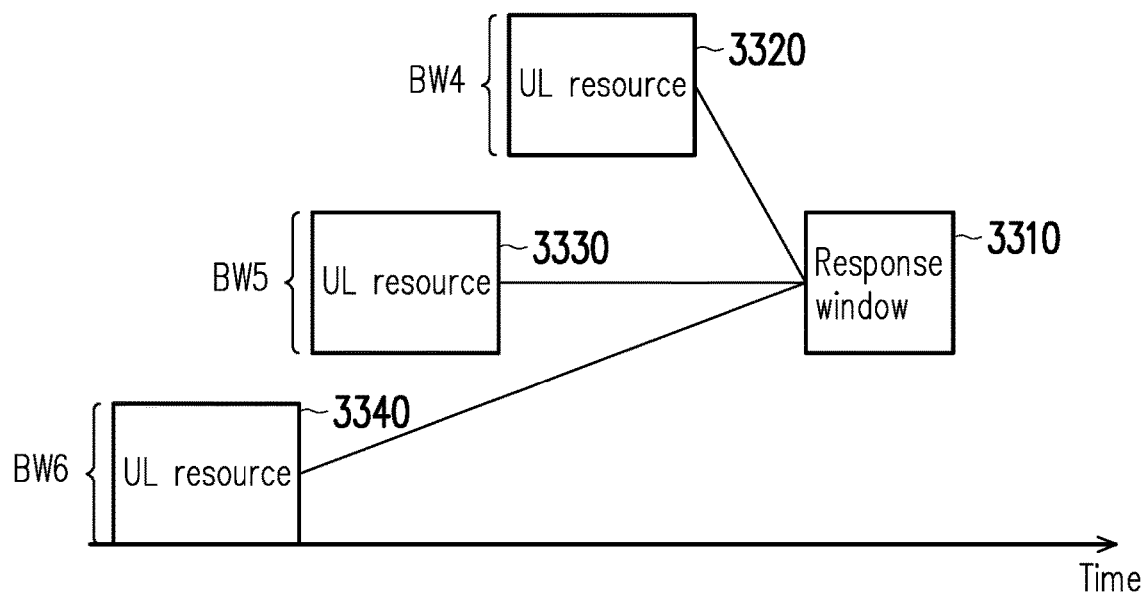
FIG. 33 is a schematic diagram of a mapping relation between multiple UL resources and a response window according to an embodiment of the disclosure.

FIG. 33 is a schematic diagram of a mapping relation between multiple UL resources and a response window 3310 according to an embodiment of the disclosure. The UE 200 may monitor the response message via a response window 3310 associated with multiple UL resources such as UL resources 3320, 3330, and/or 3340 (or multiple UL signals respectively corresponding to the UL resources 3320, 3330, and/or 3340), wherein each of the UL resources 3320, 3330, and 3340 may respectively correspond to a BW 4, BW 5, and BW 6. Each of the BW 4, BW 5, and BW 6 may correspond to different BWP configured to the UE 200, or may correspond to different sub-bands of a BWP which is configured to the UE 200.

Figure 34:
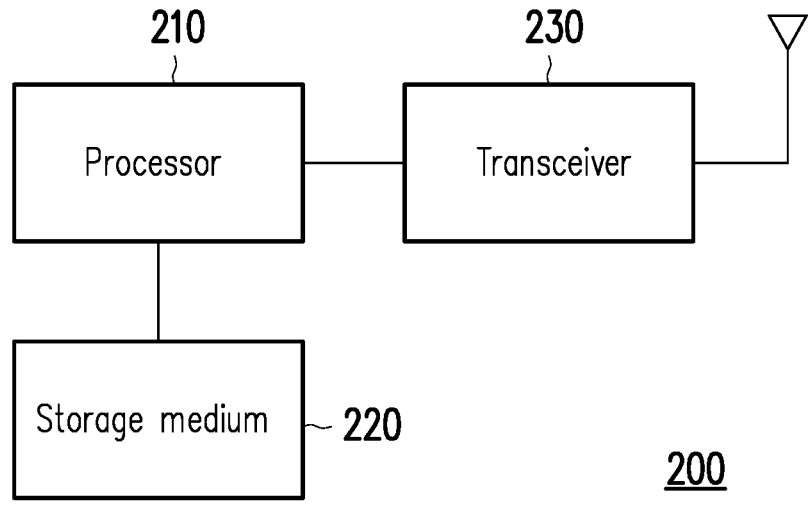
FIG. 34 is a schematic diagram of a UE according to an embodiment of the disclosure.

FIG. 34 is a schematic diagram of a UE 200 according to an embodiment of the disclosure. The UE 200 includes (but not limited to) a processor 210, a storage medium 220, and a transceiver 230.

The processor 210 is, for example, a Central Processing Unit (CPU), or other programmable general purpose or special purpose microprocessor, a Digital Signal Processor (DSP), a programmable controller, an Application Specific Integrated Circuit (ASIC), a Graphics Processing Unit (GPU) or other similar components or a combination of the above components.

The storage medium 220 is coupled to the processor 210, and is, for example, any type of a fixed or movable Random Access Memory (RAM), a Read-Only Memory (ROM), a flash memory, a Hard Disk Drive (HDD), a Solid State Drive (SSD), or similar components or a combination of the above components. The storage medium 220 stores a plurality of modules or programs for the processor 210 to access, such that the processor 210 may execute various functions of the UE 200.

The transceiver 230 is coupled to the processor 210. The transceiver 230 may transmit a DL signal and receive a UL signal. The transceiver 230 may execute operations of Low Noise Amplifying (LNA), impedance matching, frequency mixing, up-down frequency conversion, filtering, amplifying and/or similar operations. The transceiver 230 may further includes an antenna array, and the antenna array may include one or a plurality of antennas for transmitting and receiving omnidirectional antenna beams or directional antenna beams.

Figure 35:
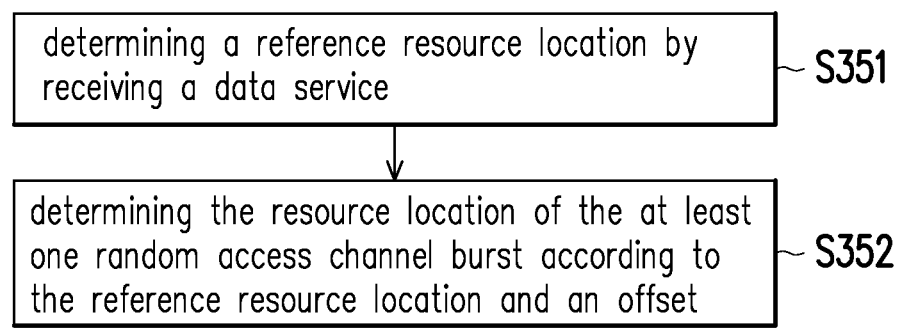
FIG. 35 is a flow chart of a method for determining at least one random access channel burst according to an embodiment of the disclosure.

FIG. 35 is a flow chart of a method for determining at least one random access channel burst according to an embodiment of the disclosure, wherein the method could be implemented by the UE 200. In step S351, determining a reference resource location by receiving a data service. In step S352, determining the resource location of the at least one random access channel burst according to the reference resource location and an offset.

Figure 36:
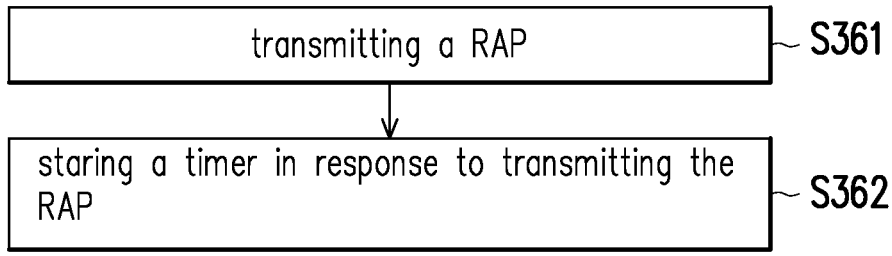
FIG. 36 is a flow chart of a method for performing a random access procedure according to an embodiment of the disclosure.

FIG. 36 is a flow chart of a method for performing a random access procedure according to an embodiment of the disclosure, wherein the method could be implemented by the UE 200. In step S361, transmitting a RAP. In step S362, staring a timer in response to transmitting the RAP.

Figure 37:
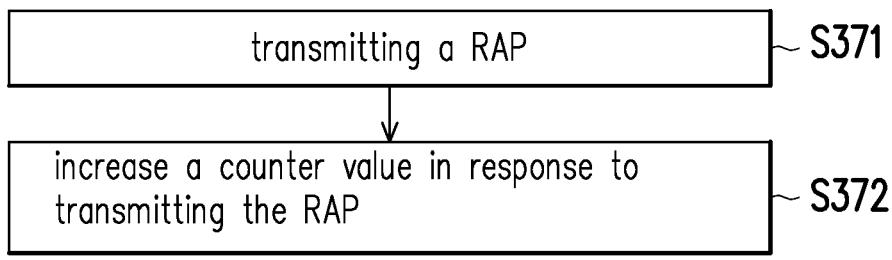
FIG. 37 is a flow chart of a method for transmitting a random access preamble according to an embodiment of the disclosure.

FIG. 37 is a flow chart of a method for transmitting a random access preamble according to an embodiment of the disclosure, wherein the method could be implemented by the UE 200. In step S371, transmitting a RAP. In step S372, increase a counter value in response to transmitting the RAP.

Figure 38:
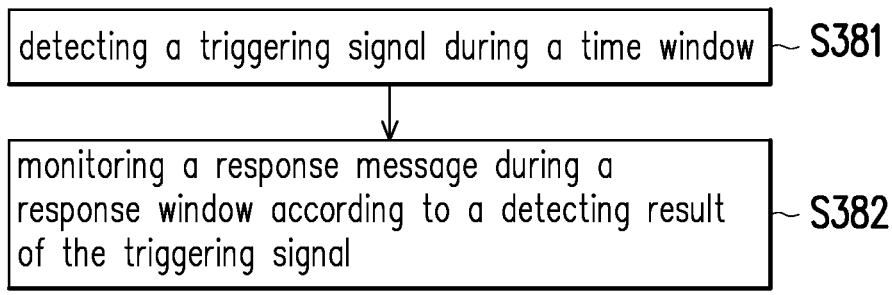
FIG. 38 is a flow chart of a method for receiving a response message according to an embodiment of the disclosure.

FIG. 38 is a flow chart of a method for receiving a response message according to an embodiment of the disclosure, wherein the method could be implemented by the UE 200. In step S381, detecting a triggering signal during a time window. In step S382, monitoring a response message during a response window according to a detecting result of the triggering signal.

In view of the aforementioned descriptions, the disclosure provides a method for a UE to estimate a resource location of a RACH burst by using an offset received from a higher layer signal. The UE may further estimate a resource location of anther RACH burst (if any) according to the estimated resource location. In addition, a timer may be utilized so that the UE may determine to report a radio link problem to an upper layer according to an expiration of the timer. A counter may be utilized so that the UE may determine that a RA problem exists or transmission power of the UE should be increased according to a counter value of the counter. A response window is designed for the UE to monitor a RAR during the response window, wherein the start of the response window may be triggered by a triggering signal. Accordingly, the UE would not spend too much time on detecting the RAR and the power of the UE can be saved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for determining at least one random access channel burst used by a user equipment comprising:
    determining a reference resource location by receiving a data service corresponding to a synchronization signal block burst;
    determining a first resource location of the at least one random access channel burst according to the reference resource location and an offset;
    determining a second resource location of the at least one random access channel burst according to the first resource location, a second offset, and a number of the at least one random access channel burst;
    performing a listen before talk procedure after determining the reference resource location, comprising: performing a first type listen before talk procedure for the at least one random access channel burst in response to not receiving a downlink signal before accessing the at least one random access channel burst;
    determining one of a plurality of random access channel sequences according to an index of the synchronization signal block burst; and
    transmitting, via the first resource location and the second resource location of the at least one random access channel burst, the one of a plurality of random access channel sequences after performing the listen before talk procedure.

2. The method of claim 1, wherein the offset indicates a time interval between the reference resource location and first the resource location.

3. The method of claim 1, wherein the second offset indicates a second time interval between the first resource location and the second resource location.

4. The method of claim 1, wherein the second offset indicates a second time interval between two of adjacent random access channel bursts corresponding to the at least one random access channel burst.

5. The method of claim 1, wherein the at least one random access channel burst further comprising a third random access channel burst corresponding to a third resource location, and the method further comprising:
    obtaining a third offset; and
    determining the third resource location according to the second resource location and the third offset.

6. The method of claim 1, wherein the offset is a next offset after a third offset associated with a third resource location of at least one first random access channel burst.

7. The method of claim 6, further comprising:
    in response to a second listen before talk procedure corresponding to the at least one first random access channel burst has failed, transmitting, via the at least one random access channel burst, the one of the plurality of random access channel sequences.

8. The method of claim 1, wherein the first resource location and the second resource location are respectively corresponded to one of the following:
    a first time-frequency resource overlapped with a bandwidth part;
    a second time-frequency resource outside of the bandwidth part;
    a third time-frequency resource corresponding to a first sub-band of the bandwidth part; and
    a fourth time-frequency resource corresponding to a second sub-band of the bandwidth part.

9. The method of claim 1, wherein the offset is pre-configured to the user equipment.

10. The method of claim 1, wherein the offset is obtained from one of the following:
    a higher layer signal, wherein the higher layer signal corresponding to a communication layer higher than a physical layer;
    a physical layer signal, wherein the physical layer signal corresponding to downlink control information or a slot format indicator; and
    an offset table.

11. The method of claim 1 further comprising: selecting one of the at least one random access channel burst for performing a communication according to one of the following:
    a random selection; a user equipment identifier; a listen before talk result for the at least one random access channel burst; a burst ordering; and an indication from a base station.

12. The method of claim 1, wherein the step of determining the first resource location of the at least one random access channel burst according to the reference resource location and the offset comprising:

determining the first resource location according to the reference resource location in response to a previous reference resource location is unavailable to the user equipment.

13. The method of claim 1 further comprising:
transmitting, via the at least one random access channel burst, the one of the plurality of random access channel sequences according to a measurement result of the synchronization signal block burst.

14. The method of claim 1 further comprising:
determining the at least one random access channel burst corresponding to the synchronization signal block burst is enabled in response to receiving the synchronization signal block burst.

15. The method of claim 1, wherein the synchronization signal block burst comprises an indicator, and the indicator indicates whether the at least one random access channel burst is enabled or not.

16. The method of claim 1 further comprising:
performing a second type listen before talk procedure for the at least one random access channel burst in response to receiving the downlink signal before accessing the at least one random access channel burst, wherein a second time gap between the downlink signal and the at least one random access channel burst is greater than a second time interval but less than a first time interval.

17. The method of claim 1 further comprising:
obtaining a third offset associated with a third resource location of the at least one random access channel burst; and
determining the third resource location according to a second reference resource location and the third offset, wherein the second reference resource location is indicated by a second synchronization signal block burst.

18. The method of claim 1 further comprising:
selecting the synchronization signal block burst from a plurality of synchronization signal block bursts.

19. The method of claim 1, wherein the reference resource location corresponding to one of the followings:
a first slot of an uplink burst in the data service;
a first slot of a downlink burst in the data service;
a last slot of the downlink burst in the data service; and
a first slot of the data service.

20. The method of claim 1, wherein the downlink signal indicates whether the at least one random access channel burst is enabled or not.

21. The method of claim 20, wherein the downlink signal comprises at least one of the following:
a shift indicator, indicating a number of slots from a downlink slot carrying the downlink signal to a start of an uplink burst in the data service;
an uplink burst duration, indicating a number of uplink slots in an uplink burst of the data service; and
a downlink burst duration, indicating a number of downlink slots in a downlink burst of the data service.

22. The method of claim 20 further comprising:
determining the at least one random access channel burst corresponding to the downlink signal is enabled in response to receiving the downlink signal.

23. The method of claim 1, wherein the reference resource location is indicated by one of the synchronization signal block burst received by the user equipment and a new radio unlicensed burst received by the user equipment.

24. The method of claim 23, wherein the step of determining the first resource location according to the reference resource location and the offset comprising:
determining the first resource location according to the synchronization signal block burst in response to not receiving the new radio unlicensed burst.

25. The method of claim 1 further comprising:
receiving a listen before talk type indicator; and
performing the listen before talk procedure for the at least one random access channel burst according to the listen before talk type indicator.

26. A user equipment comprising:
a transceiver; and
a processor connected to the transceiver and configured at least to:
determine a reference resource location by receiving, via the transceiver, a data service corresponding to a synchronization signal block burst;
determine a first resource location of at least one random access channel burst according to the reference resource location and an offset;
determine a second resource location of the at least one random access channel burst according to the first resource location, a second offset, and a number of the at least one random access channel burst;
perform a listen before talk procedure through the transceiver after determining the reference resource location, comprising: performing a first type listen before talk procedure for the at least one random access channel burst in response to not receiving a downlink signal before accessing the at least one random access channel burst;
determine one of a plurality of random access channel sequences according to an index of the synchronization signal block burst; and
transmit, via the first resource location and the second resource location of the at least one random access channel burst, one of a plurality of random access channel sequences through the transceiver after performing the listen before talk procedure.

* * * * *